(12) United States Patent
Shindo

(10) Patent No.: US 9,892,049 B2
(45) Date of Patent: Feb. 13, 2018

(54) SEMICONDUCTOR DEVICE AND METHOD FOR PREFETCHING TO CACHE MEMORY

(71) Applicant: Renesas Electronics Corporation, Kawasaki-shi, Kanagawa (JP)

(72) Inventor: Makoto Shindo, Kanagawa (JP)

(73) Assignee: Renesas Electronics Corporation, Koutou-ku, Tokyo (JP)

(*) Notice: Subject to any disclaimer, the term of this patent is extended or adjusted under 35 U.S.C. 154(b) by 0 days.

(21) Appl. No.: 14/439,355

(22) PCT Filed: Oct. 31, 2012

(86) PCT No.: PCT/JP2012/078139
§ 371 (c)(1),
(2) Date: Apr. 29, 2015

(87) PCT Pub. No.: WO2014/068694
PCT Pub. Date: May 8, 2014

(65) Prior Publication Data
US 2015/0293850 A1 Oct. 15, 2015

(51) Int. Cl.
*G06F 12/08* (2016.01)
*G06F 12/0862* (2016.01)
*G06F 12/0864* (2016.01)

(52) U.S. Cl.
CPC ...... *G06F 12/0862* (2013.01); *G06F 12/0864* (2013.01); *G06F 2212/1021* (2013.01);
(Continued)

(58) Field of Classification Search
CPC ................ G06F 2212/602; G06F 12/0862
See application file for complete search history.

(56) References Cited

U.S. PATENT DOCUMENTS 6,560,676 B1 5/2003 Nishimoto et al.
2007/0180192 A1* 8/2007 Matsuda ............. G06F 11/3409
711/118
(Continued)

FOREIGN PATENT DOCUMENTS

JP 6-75853 A 3/1994
JP 2001-195304 A 7/2001
(Continued)

OTHER PUBLICATIONS

International Search Report for PCT/JP2012/078139 dated Jan. 22, 2013 [PCT/ISA/210].

*Primary Examiner* — Ann J Lo
*Assistant Examiner* — Masud Khan
(74) *Attorney, Agent, or Firm* — Sughrue Mion, PLLC

(57) ABSTRACT

A semiconductor device includes a processor, a memory, a plurality of tags, a plurality of ways each of which can store a plurality of data of consecutive addresses of the memory in which a tag value stored in each tag of the plurality of tags is taken as a reference address, and a cache controller configured to determine whether a second way has an address change direction flag matching an address change direction flag of the first way and has a tag value continuous with a tag value of the first way in a direction opposite to a direction that the address change direction flag of the first way indicates and prefetch data indicated by a tag value continuous with the tag value of the first way in the direction that the address change direction flag indicates to the second way based on the result of the determination.

17 Claims, 18 Drawing Sheets

(52) U.S. Cl.
CPC .. *G06F 2212/281* (2013.01); *G06F 2212/602* (2013.01); *G06F 2212/6028* (2013.01); *G06F 2212/6032* (2013.04)

(56) References Cited

U.S. PATENT DOCUMENTS

| | | | |
|---|---|---|---|
| 2007/0186048 A1 | 8/2007 | Nakanishi et al. | |
| 2008/0040546 A1* | 2/2008 | Vasekin | G06F 12/0884 |
| | | | 711/128 |
| 2010/0030973 A1* | 2/2010 | Speight | G06F 12/0862 |
| | | | 711/137 |
| 2010/0077146 A1 | 3/2010 | Hosoda | |
| 2011/0238922 A1* | 9/2011 | Hooker | G06F 12/0862 |
| | | | 711/137 |
| 2012/0036310 A1 | 2/2012 | Nonaka et al. | |
| 2012/0221797 A1* | 8/2012 | Chung | G06F 12/0853 |
| | | | 711/131 |

FOREIGN PATENT DOCUMENTS

| | | |
|---|---|---|
| JP | 2005-84999 A | 3/2005 |
| JP | 2008-217825 A | 9/2008 |
| JP | 2010-73029 A | 4/2010 |
| JP | 2012-38385 A | 2/2012 |
| WO | 2005/091146 A1 | 9/2005 |

\* cited by examiner

SEMICONDUCTOR DEVICE AND METHOD FOR PREFETCHING TO CACHE MEMORY

CROSS REFERENCE TO RELATED APPLICATIONS

This application is a National Stage of International Application No. PCT/JP2012/078139, filed on Oct. 31, 2012, the contents of all of which are incorporated herein by reference in their entirety.

TECHNICAL FIELD

The present invention relates to techniques for prefetching to a cache memory, and more particularly relates to techniques that are effective when applied to a semiconductor device with a cache memory.

BACKGROUND ART

In recent years in a secure microcontroller used in an IC card (Integrated Circuit Card) and the like, the operation frequency of the CPU (Central Processing Unit) has been increased, and at the same time, a large capacity nonvolatile memory tends to be mounted. The difference in the operation frequency between the CPU and the large capacity nonvolatile memory becomes significant, and the number of those equipped with a cache memory is increasing to absorb the difference. However, the circuit size and the power consumption are limited to very small values to allow for the use in the IC card and the like.

There have been proposed various types of cache memories. For example, a technique for dividing into instruction cache and data cache, a technique for configuring a cache memory with a plurality of ways, a technique for prefetching of data including an instruction code, and the like. The adoption of these techniques is effective also for the secure microcontroller, but at the same time, it is necessary to meet stringent constraints in terms of circuit size and power consumption.

Techniques for prefetching of data in a cache memory are disclosed in Patent Documents 1 and 2. Patent Document 1 discloses a technique for reading a data block including data to be accessed when a cache miss occurs, and for prefetching a data block in a predetermined adjacent direction. The predetermined adjacent direction is updated following the access history, so that the prefetch direction can be followed to this. Patent Document 2 discloses a technique for preventing actual access from accessing unnecessary ways in a set-associative cache memory with a plurality of ways, by previously reading data which is expected to be read next by predicting which of the ways is the one from which the data will be read.

Patent Document 3 discloses a technique for reading all data for one page at once into a pre-read cache by a row address system selection operation in a nonvolatile memory, and then selecting and reading a part of the data by a column address system operation.

CITATION LIST

Patent Documents

Patent Document 1: Japanese Patent Application Laid-Open No. Hei 6(1994)-75853
Patent Document 2: Japanese Patent Application Laid-Open No. 2005-84999
Patent Document 3: Japanese Patent Application Laid-Open No. 2012-38385

DISCLOSURE OF THE INVENTION

Problems that the Invention is to Solve

The present inventors have studied Patent Documents 1, 2, and 3, and found that there is a new problem as follows.

The technique for dividing into instruction cache and data cache, the technique for configuring with a plurality of ways, and the technique for prefetching of data are considered to be effective also for the secure microcontroller used in an IC card, and the like. Cryptographic techniques include operations such as decryption of cipher using an encryption key with a long bit length, in which a continuous access of a series of data is expected and prefetching techniques are effective. In the matching process for authentication, a continuous access from two data systems is expected, so that the adoption of multiple ways is effective.

When a multi-way cache is adopted, there is a risk that only one way may be used and other ways may not be used in the continuous access of a series of data in cryptographic operations such as decryption. This is not a serious problem if each way can be equipped with a large-capacity memory array. However, if one way can be equipped with only a memory array with a capacity for only one block (one line) of a nonvolatile memory, there is no space left to store data to be prefetched next even if prefetching of data is performed. A cache miss must occur in every line and overhead occurs for a cache fill. If a memory array with a capacity for two ways is used as one way, prefetching can be performed within the way, and the cache miss does not occur in every line. However, in the case of the continuous access from two data systems, a cache miss will occur in each data access.

Means for solving the above problems will be described below. Other objects and advantages of the present invention will become apparent from the following detailed description when viewed in conjunction with the accompanying drawings.

Means for Solving the Problems

A typical one of the aspects of the invention disclosed in this application will be briefly described as follows.

That is, there is provided a semiconductor device including a processor, a memory, a plurality of tags each corresponding to each of a plurality of ways, and a cache controller. The semiconductor device is configured to allow the following operations.

When a first access and a second access are accesses performed in succession to consecutive addresses, and when the second access is the access through a first way, the cache controller performs the following operations. When the second access is the access in the direction in which the address is incremented with respect to the first access, the cache controller performs prefetching to a way having a tag value which is smaller by one than the tag value corresponding to the first way. When the second access is the access in the direction in which the address is decremented with respect to the first access, the cache controller performs prefetching to a way with a tag value which is greater by one than the tag value corresponding to the first way.

Effects of the Invention

The effect obtained by a typical one of the aspects of the invention disclosed in this application will be briefly described as follows.

That is, in a cache memory configured with a plurality of ways, it is possible to autonomously switch between functions, whether the ways remain functioning as the plurality of ways or two ways function as prefetched data storage destinations for each other to function as one way, according to the access history.

BEST MODE FOR CARRYING OUT THE INVENTION

1. Summary of the Embodiment

Figure 1:
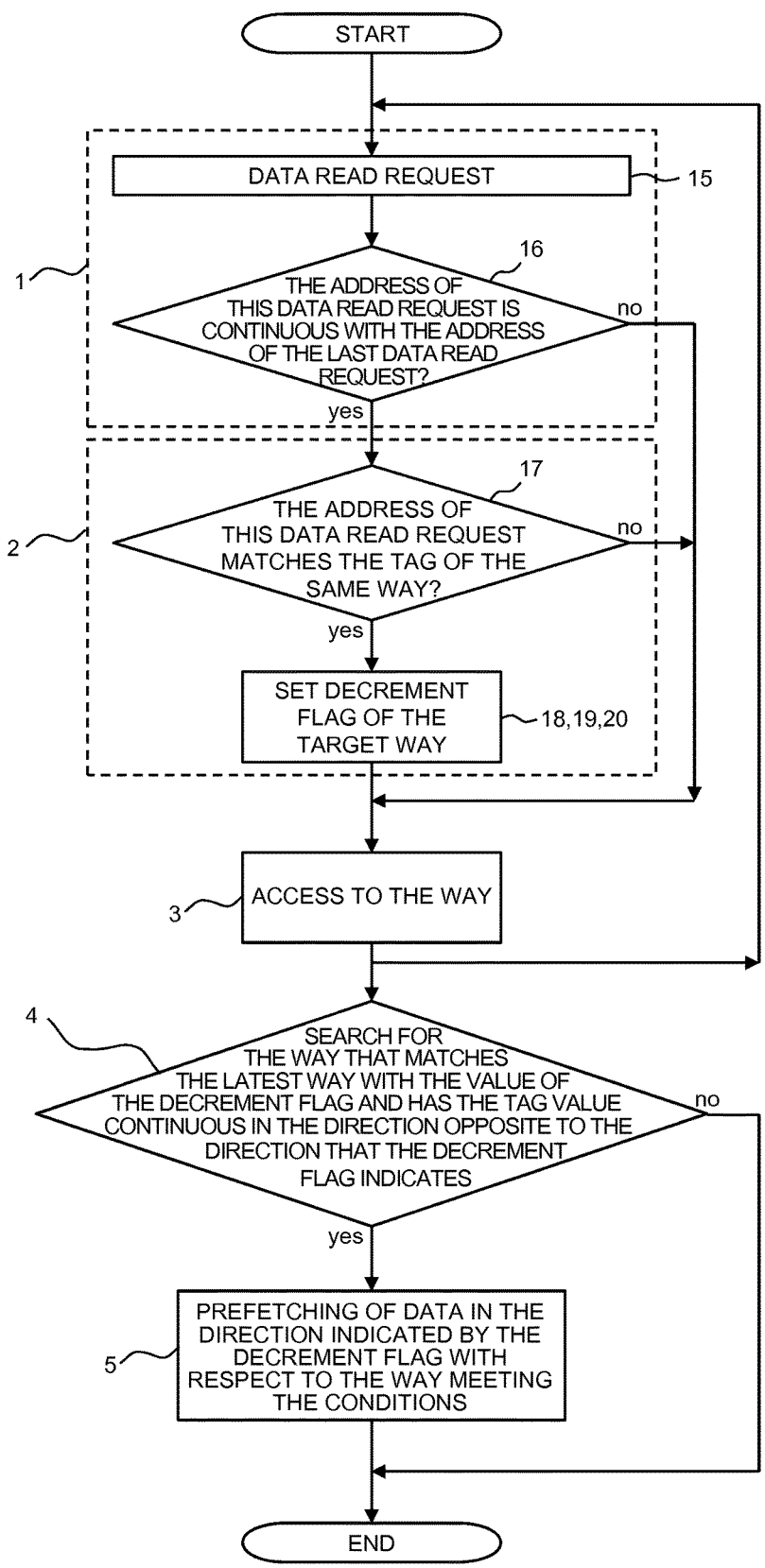
FIG. 1 is a flow chart of an operation example of a semiconductor device according to an embodiment.

First, a summary of a representative embodiment of the invention disclosed in this application will be described as follows. The reference numerals in parentheses referring to components in the summary of the representative embodiment only illustrate those included in the concept of the components with the same reference numerals in the figures.

[1] <Prefetching to the Way with a Tag Value Continuous in the Opposite Direction>

There is provided a semiconductor device (50) including a processor (53), a memory (55), a plurality of tags (65), a plurality of ways (64), each of which can store a plurality of data of consecutive addresses of the memory in which the tag value stored in the each tag is taken as the reference address, and a cache controller (63). The semiconductor device (50) is configured as follows.

An address change direction flag (66) is provided for each of the ways to indicate either the direction in which the address is incremented or decremented with respect to the last two accesses to the way.

When a first way and a second way are accesses that are performed in succession to consecutive addresses from the processor to the memory (1), and when the second access is the access through a first way, the cache controller is configured to allow a predetermined prefetch operation on the second way that meets the following conditions. The conditions are that the second way should have an address change direction flag that matches the address change direction flag corresponding to the first way, and have the tag value continuous in the direction opposite to the direction that the address change direction flag indicates with respect to the tag value corresponding to the first way (4). The predetermined prefetch operation is the prefetch of data, which is indicated by the tag value continuous in the direction that the address change direction flag indicates, with respect to the tag value corresponding to the first way (5).

In this way, in the cache memory configured with a plurality of ways, it is possible to autonomously switch between functions, whether the ways remain functioning as the plurality of ways or two ways function as prefetched data storage destinations for each other to function as one way, according to the access history.

[2] <Update of the Decrement Flag>

In Section 1, when the second access is the access to the same way and the same tag value as in the case of the first access, and if the target address of the second access is smaller than the target address of the first access, the cache controller is configured to allow setting of the address change direction flag (2).

In this way, it is possible configure the address change direction flag (66) to be autonomously set by the cache controller based on the access history to the cache memory.

[3] <Cache Fill in a Unit of a Word>

In Section 1, if it is a cache miss, the cache controller is configured to allow cache fill in units of the data length obtained by dividing the total data length of the data stored in the way by an integer.

In this way, the power consumption for cache fill can be reduced to a lower level.

[4] <Valid Flag>

In Section 3, in the cache controller, each of the ways is equipped with a valid flag (67) in units of the data length of the cache fill. When a cache miss occurs, the cache controller is configured to allow clearing of all the valid flags corresponding to the target way for the cache fill (23), and allow setting of the valid flag corresponding to the cache fill data (25).

In this way, it is possible to output data or perform cache fill by determining a cache hit or miss in units of data of a predetermined data length stored in the way.

[5] <Prefetching of Data in the Same Way Backward by Using the Valid Flag>

In Section 4, the cache controller is configured to allow prefetching of data into the area within the first way, in which the corresponding valid flag is not set, in the direction indicated by the address change direction flag corresponding to the first way after the second access (12, 13, 14).

In this way, it is possible to perform prefetching in the same way backward (in the address direction opposite to the continuous direction) so as to have a hit as long as the data is within the same way, even when the state of the continuous address is lost and when the access is performed in the address direction opposite to the continuous direction.

[6] <Prefetching of Data in the Opposite Direction after Prefetching of Data in the Address Change Direction of the Same Way>

In Section 5, the cache controller is configured to allow the following operations.

When the address change direction flag corresponding to the second way matches the address change direction flag corresponding to the first way, and when the tag value corresponding to the second way is continuous in the direction opposite to the direction that the address change direction flag indicates with respect to the tag value corresponding to the first way, the cache controller performs prefetching of data to the second way after prefetching of data into the area within the first way.

When the address change direction flag corresponding to the second way does not match the address change direction flag corresponding to the first way, or when the tag value corresponding to the second way is not continuous in the direction opposite to the direction that the address change direction flag indicates with respect to the tag value corresponding to the first way, the cache controller performs the following prefetch operation. After prefetching of data into the area within the first way, the cache controller performs prefetching of data into the area within the first way in the direction opposite to the direction indicated by the address change direction flag corresponding to the first way, after the second access to the first way.

In this way, even in the case of prefetching over the two ways, it is possible to perform prefetching in the same way backward (in the address direction opposite to the continuous direction) so as to reduce the probability of cache misses, even when the state of the continuous access is lost and when the access is performed in the address direction opposite to the continuous direction.

[7] <Hiding of the Prefetch Execution Cycle>

In Section 1, the processor is configured to allow execution of the access following the second access, after the second access is completed and before the cache memory completes the prefetch.

In this way, it is possible to hide the cycle for the execution of the prefetch, and to increase the number of valid instruction cycles performed per unit of time.

[8] <Fully Associative>

In Step 1, each of the ways is configured to allow caching of data of an arbitrary address of the memory.

In this way, each way can also cache data of an arbitrary address, without being limited to the address in the memory for the data to be stored.

[9] <Data Cache>

In Section 1, the semiconductor device is further provided with an instruction cache, in which the ways are data caches for the processor.

In this way, it is possible to configure the cache specific to data. In general, in the case of data, the regularity of the addresses in continuous access is simple as compared to the case of instruction. Continuous access to a series of data, and alternate access to data of two systems that are continuous with each other are very likely to occur. Based on this feature, it is possible to simplify the cache circuit, in particular, the cache controller.

[10] <Method for Prefetching Data>

There is provided a method for prefetching data in a cache memory (60). The cache memory (60) is located between the processor (53) and the memory (55), and is provided with a plurality of tags (65), and a plurality of ways (64) each capable of storing a plurality of data of consecutive addresses of the memory in which the tag value stored in the each tag is taken as the reference address. The method for prefetching data includes the following steps.

A first step is to determine whether or not a first access and a following second access are accesses that are performed in succession to consecutive addresses from the processor to the memory (1).

A second step is to give the address change direction attribute that indicates either the direction in which the address is incremented or decremented with respect to the last two accesses to the way, when the determination result of the first step is the accesses to consecutive addresses, and when the first access and the second access are the accesses to a same one of the plurality of ways and by the same tag value (2).

A third step is to access the first way by the second access (3).

A fourth step is to determine the presence or absence of a second way having the same address change direction attribute as of the first way, and having the tag value continuous in the direction opposite to the direction that the same address change direction attribute indicates with respect to the tag value of the first way (4).

A fifth step is to perform prefetching of data, which is indicated by the tag value continuous in the direction that the address change direction attribute indicates, with the second way taken as the target, based on the determination result of its presence in the fourth step (5).

In this way, in the cache memory configured with the plurality of ways, it is possible to autonomously switch between functions, whether the ways remain functioning as the plurality of ways or two ways function as prefetched data storage destinations for each other to function as one way, according to the access history.

[11] <Prefetching of Data Regardless of Cache Hit/Miss>

In Section 10, the fourth step is performed after the third step, regardless of whether the result of the third step is cache hit or cache miss (21, 22 . . . C2 . . . 4). If it is a cache miss in the third step, the third step updates the tag value of the first way (26). Then, the fifth step determines whether or not to perform the prefetch based on the updated tag value of the first way.

In this way, it is possible to prevent overhead from occurring due to the cache miss. In addition to the case in which the cache fill is performed after a cache miss occurred, the data is prefetched also during a cache hit. Thus, it is possible to continuously have a cache hit during the continuous access. For example, it is possible to allow either of the ways to constantly have a cache hit by the operation of performing prefetching to one way in a free cycle during when the other way has a hit.

[12] <Update of the Decrement Flag>

In Section 10, when the second access is the access to the same way and the same tag value as in the case of the first access (17), and when the target address of the second access is smaller than the target address of the first access (18), the first step sets the address decrement direction as the address change direction attribute (20).

In this way, it is possible to configure to allow the address change direction attribute to be autonomously set by the cache controller based on the access history to the cash memory.

[13] <Cache Fill in a Unit of a Word>

In Section 10, if it is a cache miss, the third step performs a cache fill in units of the data length obtained by dividing the total data length of the data stored in the way by an integer.

In this way, it is possible to reduce the power consumption for the cache fill.

[14] <Valid Flag>

In Section 13, each of the ways has the valid flag in units of data length of the cache fill (67). When a cache miss occurs in the third step, the cache controller clears all the valid flags corresponding to the target way of the cache fill (23), and then sets the valid flag corresponding to the cache fill data (25).

In this way, it is possible to output data or perform a cache fill by the determination of a cache hit or miss per data in units of a predetermined data length stored in the way.

[15] <Prefetching of Data in the Same Way Backward Using the Valid Flag>

In Section 14, the method further includes a sixth step (13) of performing prefetching of data into the area within the first way in which the corresponding valid flag is not set, in the direction indicated by the address change direction attribute corresponding to the first way, after the third step.

In this way, it is possible to perform prefetching in the same way backward (in the address direction opposite to the continuous direction) so as to have a hit as long as the data is within the same way, even when the state of the continuous access is lost and when the access is performed in the address direction opposite to the continuous direction.

[16] <Prefetching of Data in the Opposite Direction after Prefetching of Data in the Address Change Direction of the Same Way>

In Section 15, the method further includes a loop to repeat the sixth step (13) to perform prefetching of data into the area within the first way in which the corresponding valid flag is not set, in the direction opposite to the direction indicated by the address change direction attribute corresponding to the first way, by performing the fourth step after the sixth step and based on the determination result of its absence in the fourth step.

In this way, even when the prefetch operation is performed over two ways, it is possible to perform prefetching in the same way backward (in the address direction opposite to the continuous direction) so as to reduce the probability of cache misses, even when the state of the continuous access is lost and when the access is performed in the address direction opposite to the continuous direction.

[17] <Prefetching to the Way Having the Tag Value Continuous in the Opposite Direction>

A semiconductor device (50) includes a processor (53), a memory (55), a plurality of tags (65) corresponding one-to-one to a plurality of ways (64), and a cache controller (63). The semiconductor device (50) is configured as follows.

When a first access and a second access are accesses that are performed in succession to consecutive addresses from the processor to the memory, and when the second access is the access through the first way (1), the cache controller (63) is configured to allow the following operations.

When the second access is the access in the direction in which the address is incremented with respect to the first access, the cache controller performs prefetching of data with respect to the way having a tag value smaller by one than the tag value corresponding to the first way (4, 40). When the second access is the access in the direction in which the address is decremented with respect to the first access, the cache controller performs prefetching of data with respect to the way having a tag value greater by one than the tag value corresponding to the first way (4, 45).

In this way, in the cache memory configured with the plurality of ways, it is possible to autonomously switch between functions, whether the ways remain functioning as the plurality of ways or two ways function as prefetched data storage destinations for each other to function as one way, according to the access history.

2. Further Detailed Description of Embodiments

The embodiment will be described further in detail. Note that in all the drawings for explaining the embodiment, the same components with the same functions are denoted by the same reference numerals, and the repetitive description thereof will be omitted.

SUMMARY OF EMBODIMENT

Figure 2:
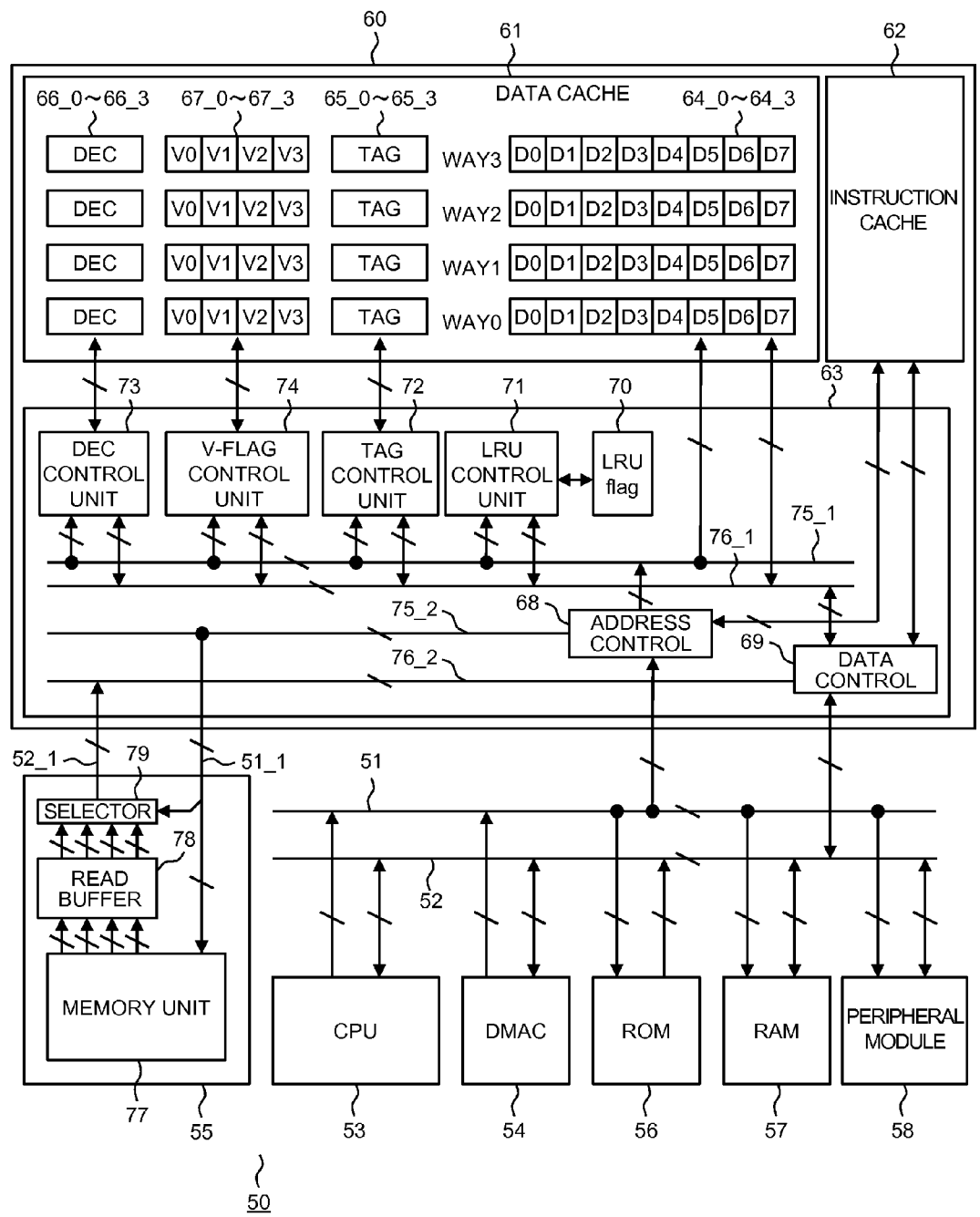
FIG. 2 is a block diagram showing a configuration example of the semiconductor device according to an embodiment.

FIG. 2 is a block diagram showing a configuration example of a semiconductor device according to an embodiment.

In a semiconductor device according to an embodiment, a cache memory 60 is located between a processor 53 and a memory 55. The memory 55 may be a nonvolatile memory such as, for example, a flash memory, or may be any memory allocated in the memory space of the processor 53. The cache memory 60 includes an instruction cache 62 and a data cache 61. The data cache 61 includes a plurality of tags 65_0 to 65_3, as well as a plurality of ways 64_0 to 64_3 each of which can store a plurality of data of consecutive addresses of the memory 55 in which the tag value stored in the each tag is taken as the reference value. The tags 65_0 to 65_3 are associated one-to-one with the ways 64_0 to 64_3. For example, data D0 to D7 for 16 addresses are stored in the way 64_0 starting from the tag value stored in the tag 65_0. The number of sets of ways and tags is arbitrary and it is required to have at least two sets. Also, the number of data stored in one way and the data length (bit length) per data are arbitrary. It is possible to determine these parameters by taking into account the unit of access from the processor 53 as well as the interface with the nonvolatile memory 55 to be cached. Other components shown in FIG. 2 will be described below.

FIG. 1 is a flow chart of an operation example of a semiconductor device according to an embodiment.

Upon a data read request which is an access from the processor 53 to the nonvolatile memory 55, the cache controller determines whether or not the data read request and the last data read request are the data read requests to consecutive addresses (Step 1). As a result, if it is determined that they are the data read requests to consecutive addresses, and when the two continuous requests are the accesses to the same way and by the same tag value, the cache controller gives an address change direction attribute that indicates either the direction in which the address is incremented or decremented with respect to the last two accesses to the way (Step 2). Then, the cache controller accesses the way (access target way) in response to this data read request (Step 3).

Next, the cache controller determines the presence or absence of another way (prefetch target way) that has the same address change direction attribute as of the way (access target way) that is accessed in Step 3, and has the tag value continuous in the direction opposite to the direction that the address change direction attribute indicates with respect to the tag value of the access target way (Step 4). Based on the determination of its presence in the fourth step, the cache controller performs prefetching of data, which is indicated by the tag value continuous in the direction indicated by the address change direction attribute of the access target way, with respect to the prefetch target way (Step 5).

In this way, in the cache memory configured with a plurality of ways, it is possible to autonomously switch between functions, whether the ways remain functioning as the plurality of ways or two ways function as prefetched data storage destinations for each other to function as one way, according to the access history.

The case of two ways is considered in order to help understand the operation principle. The way 0 (64_0) and the tag 0 (65_0) correspond to each other, and the way 1 (65_1) and the tag 1 (65_1) correspond to each other. Now, when the access to the way 0 (64_0) is read from the address A, the cache controller first gives an address change direction attribute to the way 0 (64_0) (Step 2). When the last access to the way 0 (64_0) is the access to the address A−1, the address is in the increment direction. On the other hand, when the last access is the access to the address A+1, the address is in the decrement direction. The address change direction attribute is given to each way. The tag 0 (65_0) corresponding to the way 0 (64_0) stores the upper address of the address A. If the access to the way 0 (64_0) is a cache miss, the upper address of the address A is stored in the tag 0 (65_0) by a cache fill.

Next, the cache controller searches for a way suitable for prefetching. Now, it is assumed there are only two ways, so that it is considered the case in which the operation determines whether or not the way 1 (64_1) is appropriate for the prefetch target to the access target way 0 (64_0). The conditions of determination are as follows: whether the way has the same address change direction attribute and has the tag value continuous in the direction opposite the direction that the address change direction attribute indicates with respect to the tag value of the access target way (Step 4). The condition that the way 1 (64_1) has the same address change direction attribute as of the way 0 (64_0) reflects the access history that shows that both the ways are continuously accessed in the change direction of the same address. Further, the condition that the tag 1 (65_1) corresponding to the way 1 (64_1) has the tag value continuous with the tag value stored in the tag 0 (65_0) corresponding to the way 0 (64_0) in the direction opposite to the direction that the address change direction attribute indicates, shows that the way 1 (64_1) is the one that has been accessed. Thus, when meeting this condition, the way 1 (64_1) has been continuously accessed by the data of the same system, and is highly likely to have been accessed. Thus, the probability that the way 1 (64_1) is accessed again is low, and it is possible to determine that the way 1 (64_1) is appropriate for the prefetch target that follows the access to the way 0 (64_0).

Thus, the cache controller performs prefetching of data in the direction that the address change direction attribute indicates, in which the way 1 (64_1) is taken as the prefetch target (Step 5). For example, the address change direction is the increment direction, and A', which is the upper address of the address A, is stored in the tag 0 (65_0) as the tag value. At this time, when the way 1 (64_1) is the one that has been accessed by a series of accesses of the same data system, A'-1 must be stored in the corresponding tag 1 (65_1). On the other hand, when the condition is not met, the way 1 (64_1) is highly likely to be used for caching the data of another system stored in another address area. For this reason, the way 1 (64_1) is not appropriate for the prefetch target and prefetching is not performed.

As described above, in the present embodiment, the cache controller determines whether or not the way is appropriate for the prefetch target, based on whether or not the address change direction attribute and the tag value are continuous with each other. If there is a way appropriate for the prefetch target, the cache controller combines the access target way and the prefetch target way to function as if they were one way with the prefetch function. On the other hand, if there is no way appropriate for the prefetch target, the cache controller allows the ways to function as they are multiple ways in such a way that each way acts as an independent way. In general, the determination of whether or not to perform prefetching of data is made based on the access history. In the present embodiment, by focusing on the point that the tag value reflects the access history, the cache controller autonomously determines and switches the prefetch function of the ways only by giving the address change direction attribute that indicates the direction, without a special control from the outside. The cache circuit holds the access history that is aggregated to the information on whether or not the address change direction attribute and the tag value are continuous with each other, so that it is possible to autonomously determine the prefetch function of the ways.

It is to be noted here that one way does not include a plurality of tags but that each way is associated one-to-one with a tag. In other words, one way is configured with only one line and one tag corresponding to the line. If a cache with at least two lines is provided, it is possible to allow it to function as either a 1-way cache with the prefetch function or as a 2-way cache, by autonomously switching between the two functions. In particular, the present embodiment is effective when applied to small and low-power-consuming cache circuits having strict requirements for circuit size and power consumption, such as a secure microcontroller that can be mounted to an IC card, rather than applied to larger cache circuits.

Embodiment (Configuration Example)

FIG. 2 is a block diagram showing a configuration example of a semiconductor device according to an embodiment. The configuration example will be described more in detail than in Summary of Embodiment. The semiconductor device 50 according to the present embodiment is, for example, the microcontroller 50 used in an IC card. The microcontroller 50 is formed by the well-known semiconductor manufacturing technology, or formed as a multi-chip module with the nonvolatile memory 55 as another chip. The present embodiment is not limited by the implementation method of the semiconductor device.

The microcontroller 50 includes CPU 53, DMAC 54, ROM 56, RAM 57, and a peripheral module 58, all of which are connected to each other through an address bus 51 and a data bus 52. The DMAC (Direct Memory Access Controller) 54 can perform transfer data by accessing a memory independently of the CPU, based on the transfer parameter set by the CPU 53. The ROM (Read Only Memory) 56 and the RAM (Random Access Memory) 57 are memories. The ROM 57 stores the instruction cord of the program that is executed by the CPU 53, as well as the initial value of the data. The RAM 57 stores the value of the variable used in the program. The peripheral module 58 is, for example, a timer module or a communication interface module. Other components such as a bus arbitration circuit and an interrupt control circuit, which are not shown, can also be provided.

The nonvolatile memory 55 is connected to the address bus 51 and the data bus 52 through the cache memory 60, and can be accessed from the bus masters such as the CPU 53 and the DMAC 54. The nonvolatile memory 55 and the cache memory 60 are interconnected through a dedicated address bus 51_1 and a dedicated data bus 52_1.

The nonvolatile memory 55 is a nonvolatile memory, such as, for example, a flash memory, a phase change memory, or a ferroelectric memory. It is possible to replace the nonvolatile memory 55 with any memory element allocated in the memory space of the CPU 53. Nonvolatile memories such as DRAM and SDRAM, or memories other than the semiconductor can also be used. For example, the nonvolatile memory 55 includes a read buffer 78 and a selector 79. The nonvolatile memory 55 reads the data of the address specified by the upper bit of the address bus 51_1 from a memory unit 77, and temporarily stores the data in the read buffer 78. Then, the nonvolatile memory 55 selects a part of the stored data and outputs to the data bus 52_1. The size of the read buffer 78 is configured to match the number of bits of the memory cell connected to one word line in the memory unit 77, so that the power consumption for the access of the nonvolatile memory 55 can be reduced to a low level. Further, it is preferable to provide a pre-read cache, which is described in Patent Document 3, because the reduction in the power consumption can be achieved more effectively. In the present embodiment, it is assumed that the read buffer 78 is 16 bytes and the data bus 52_1 is 4 bytes, but these values are not particularly limited to these specific examples.

The cache memory 60 includes the data cache 61, the instruction cache 62, and the cache controller 63. The data cache 61 is provided with four ways 64_0 to 64_3. Tags 65_0 to 65_3, decrement flags 66_0 to 66_3, and valid flags 67_0 to 67_3 are respectively associated with each of the ways. For example, the LRU (Least Recently Used) method can be adopted for the control of the cache. This method is designed to perform a cache fill on the least recently used way when a cache miss occurs. The cache controller 63 is provided with an address control unit 68 and a data control unit 69, to control the interface of the access command with the CPU 53, and the like, through the address bus 51 and the data bus 52, as well as the interface with the nonvolatile memory 55. The cache controller 63 is further provided with an LRU flag 70, an LRU control unit 71, a tag control unit 72, a decrement flag control unit 73, and a valid flag control unit 74, to control the tags 65_0 to 65_3, decrement flags 66_0 to 66_3, and valid flags 67_0 to 67_3 of the data cache. The LRU control unit 71, the tag control unit 72, the decrement flag control unit 73, and the valid flag control unit 74 are connected to an internal address bus 75_1 and an internal data bus 76_1.

Each of the ways 64_0 to 64_3 can store a plurality of data. The data in each way includes data of consecutive addresses. The upper address, which is common to the data stored in the way, is stored in the corresponding tag. In the present embodiment, it is assumed that the data per address is 1 byte (8 bits) and the bit length of the data configuring the way is 2 bytes (16 bits). Each way can store 8 data of 2 bytes. The upper bits of the address except the lower 4 bits correspond to the tag value. The data bus 52 is assumed to have a width of 2 bytes. The cache can be made fully associative. The data stored in each way can be allocated to any address of the memory space of the CPU 53.

The decrement flags 66_0 to 66_3 are the flags that indicate either the access to each of the ways 64_0 to 64_3 is the access in the direction in which the address is incremented or the access in the direction in which the address is decremented, with respect to the last access to the same way. The decrement flags are provided for each of the ways. The valid flags 67_0 to 67_3 are the flags that indicate whether the data of each of the respective ways 64_0 to 64_3 are valid. A flag of one bit is provided for each data size of one cache fill with respect to the data configuring the ways 64_0 to 64_3. For example, assuming that the data D0 to D7 configuring the ways 64_0 to 64_3 are data of 2 bytes (16 bits), respectively, in which the cache fill is performed in every 4 bytes (32 bits), a flag of 1 bit is provided in every 4 bytes. Thus, a total of 4 bits V0 to V4 are included in each flag. In the present embodiment, the address is assigned to each byte. If the data read request is 2 bytes long, the address that continues in even numbers is referred to as consecutive addresses. If the data read request is 4 bytes long, the address that continues in multiples of 4 is referred to as consecutive addresses.

By providing caches for both data and instruction, respectively, it is possible to adopt the cache method specific to each of them. In general, the regularity of the address for continuous access is simple in the case of data as compared to the case of instruction. Continuous access to a series of data and alternate access to data of successive two systems occur quite often. In the light of this feature, it is possible to simplify the cache circuit, and in particular, the cache controller. This embodiment shows an example of four ways, but it is also possible to use two ways. As long as at least two ways are provided, it is possible to respond to both continuous access to a series of data and alternate access to of successive two systems. However, it is also possible to configure the cache by one cache memory without distinguishing between data and instruction. In this case, if the number of ways is increased, it can be expected that the ways are separated into ways to cache data and ways to cache instructions in the operation state. This is advantage in that the control is centralized. Although the embodiment using the data cache is described here, the same configuration can also be applied to the instruction cache. Each way can be made fully associative. In this way, it is possible for each way to also cache data of any address without restriction of the address of the data in the memory.

The bit length of a cache fill is set, for example, to 4 bytes. Thus, 4 bytes are provided not only for the internal data bus 76_1, but also for the LRU control unit 71, the tag control unit 72, and the decrement flag control unit 73, which are connected to the internal data bus 76_1, and provided for the interface circuit of the valid flag control unit 74, respectively. In this way, it is possible to reduce the circuit size and the power consumption. Further, it is possible to determine a cache hit/miss in units of 4 bytes stored in the way, to output data or perform a cache fill. On the other hand, it is also possible to match the number of data provided for each way to the number of data connected to one word line of the nonvolatile memory. In this case, it does not require the read buffer 78 and the selector 79 provided in the nonvolatile memory 55, allowing all data read from one word line to be filled in the way at the same time. Thus, it is possible to speed up the cache fill operation. At this time, the valid flag can be set to 1 bit for each way. Further, the configuration without having the valid flag can also be possible. The bit length of the cache fill can be appropriately designed by taking into account the circuit size, the power consumption, and the cache fill speed as described above.

[Operation Flow]

Details of an operation example of the semiconductor device shown in FIG. 2 will be described. FIGS. 3, 4, 5, and 6 are flow charts showing a detailed operation example of the semiconductor device according to an embodiment.

When a bus command is issued from the bus master, such as the CPU 53 or the DMAC 54, through the address bus 51 and the data bus 52, the cache controller 63 of the cache memory 60 determines whether or not the bus command is an instruction fetch or a data access, in particular, whether or not it is a data read request to the nonvolatile memory 55 (Step 11). If the command is not the data read request to the nonvolatile memory 55, the cache controller 63 determines whether or not all data areas of all the ways 64_0 to 64_3 of the cache are valid (Step 12). The cache controller 63 determines the presence of a flag in which 1 is not set, out of V0 to V4 configuring each of the valid flags 67_0 to 67_3. If invalid data is present, namely, if there is a flag in which 1 is not set out of V0 to V4 configuring each of the invalid flags 67_0 to 67_3, the cache controller 63 read the data from the nonvolatile memory 55 and writes in the corresponding data area (Step 13). The cache controller 63 sets the valid flag corresponding to the data area of the written way, to 1 (Step 14). In this way, it is possible to perform prefetching of data, or to preliminarily read the data (backward data) in the direction opposite to the prefetch direction indicated by the same tag, by using the period of not issuing the bus command. As a result, it is possible to reduce the probability of cache misses.

If the issued bus command is the data read request to the nonvolatile memory 55 (Step 11), the cache controller 63 of the cache memory 60 fetches the address of the bus command (Step 15), and determines whether or not the address of this read request is continuous with the address of the last read request (Step 16). If the address is continuous, the cache controller 63 proceeds to Step 2 to give the address change direction attribute to the way. If the address is not continuous, the cache controller 63 proceeds to Step 3 to access the way. This process is shown as the connector C2 in FIGS. 3 and 4.

In Step 2 that gives the address change direction attribute to the way, the cache controller 63 performs setting and update of the decrement flags 66_0 to 66_3. The cache controller 63 determines whether or not the address of this read request matches the tag of one of the ways in the cache (Step 17). If the address does not match, the cache controller 63 proceeds to Step 3 to access the way. This process is shown as the connector C2 in FIGS. 3 and 4. If there is a way with the matching tag value, the cache controller 63 determines whether or not the address of the continuous access is in the increment direction or the decrement direction (Step 18). As a result, if the address is in the increment direction, the cache controller 63 sets the decrement flag of the target way to 0 (Step 19). If the address is in the decrement direction, the cache controller 63 sets the decrement flag of the target way to 1 (Step 20). Then, the cache controller 63 proceeds to Step 3 to access the way. This process is shown as the connector C3 in FIGS. 3 and 4.

Figure 4:
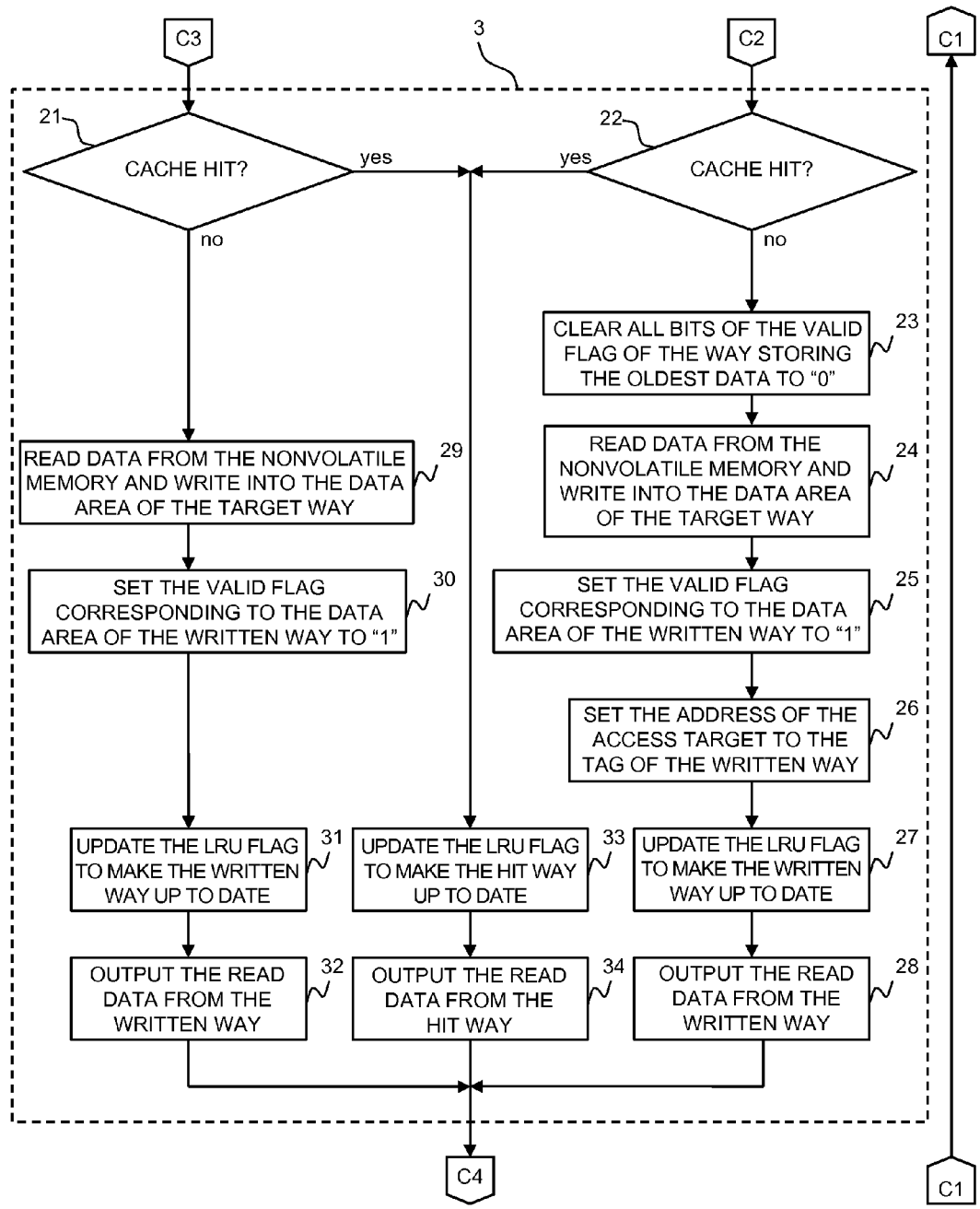
FIG. 4 is a flow chart of a detailed operation example of a semiconductor device according to an embodiment (2/4)

If it is not the continuous access (Step 16), or if there is no way having the tag value that matches the address of this read request even in the continuous access (Step 17), the cache controller 63 proceeds to Step 3 to access the way through the connector C2 (FIG. 4). First, the cache controller 63 determines whether or not it is a cache hit (Step 22). If it is a cache hit, the cache controller 63 updates the LRU flag 70 to make the hit way up to date (Step 33), and outputs the read data from the hit way (Step 34). If it is a cache miss, the cache controller 63 performs a cache fill in the way in which the oldest data is stored, which is specified by the LRU flag 70. More specifically, the cache controller 63 clears all the bits (V0 to V3) of the valid flag of the way in which the oldest data is stored, to 0 (Step 23). Then, the cache controller 63 reads the data from the nonvolatile memory 55 and writes into the data area of the target way (Step 24), and sets the valid flag corresponding to the data area of the way in which the data is written, to 1 (Step 25). Next, the cache controller 63 sets the address to be accessed to the tag of the way in which the data is written (Step 26), and updates the LRU flag 70 so that the way in which the data is written is up to date (Step 27). Then, the cache controller 63 outputs the read data from the way in which the data is written (Step 28).

Figure 3:
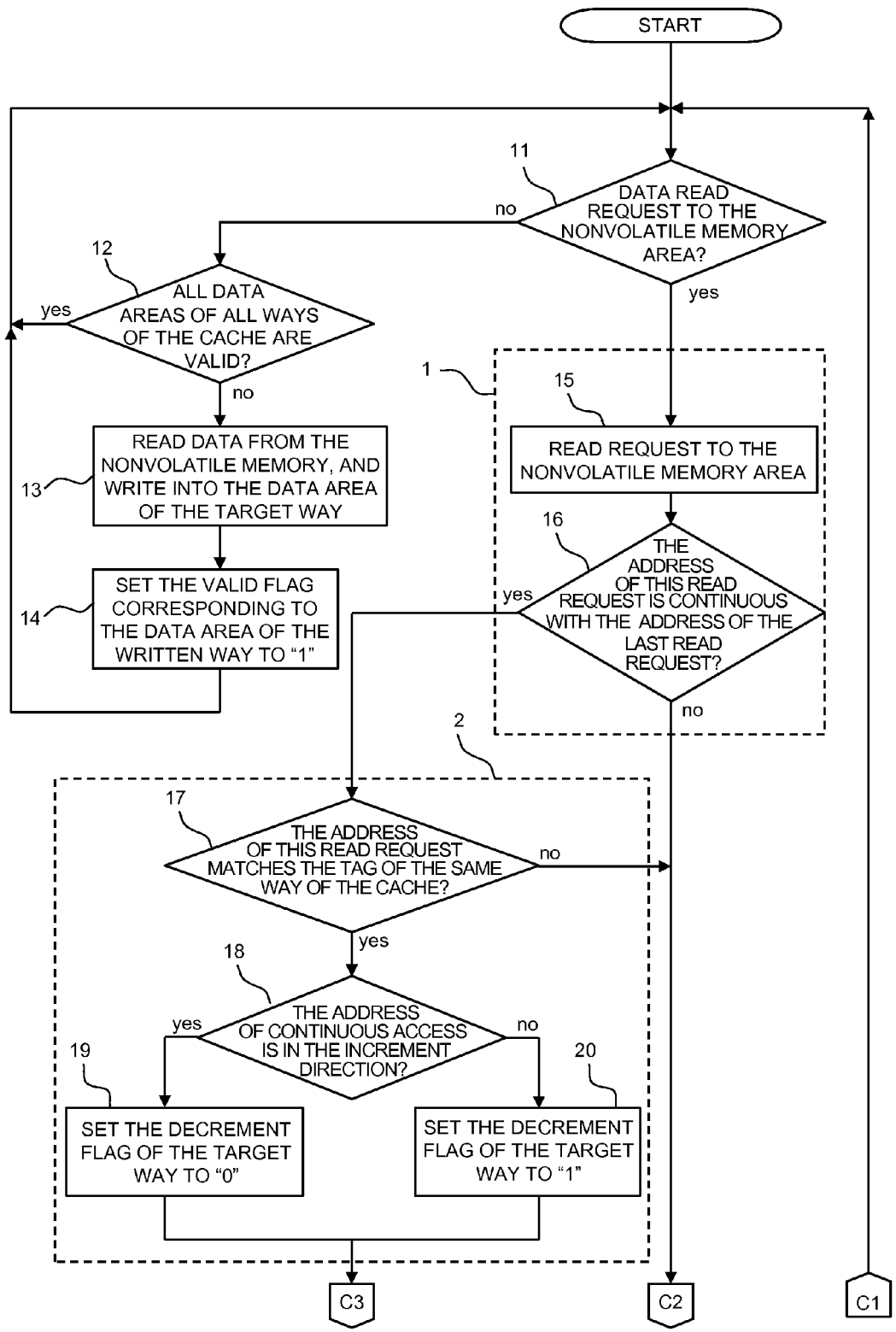
FIG. 3 is a flow chart of a detailed operation example of a semiconductor device according to an embodiment (1/4)
Figure 5:
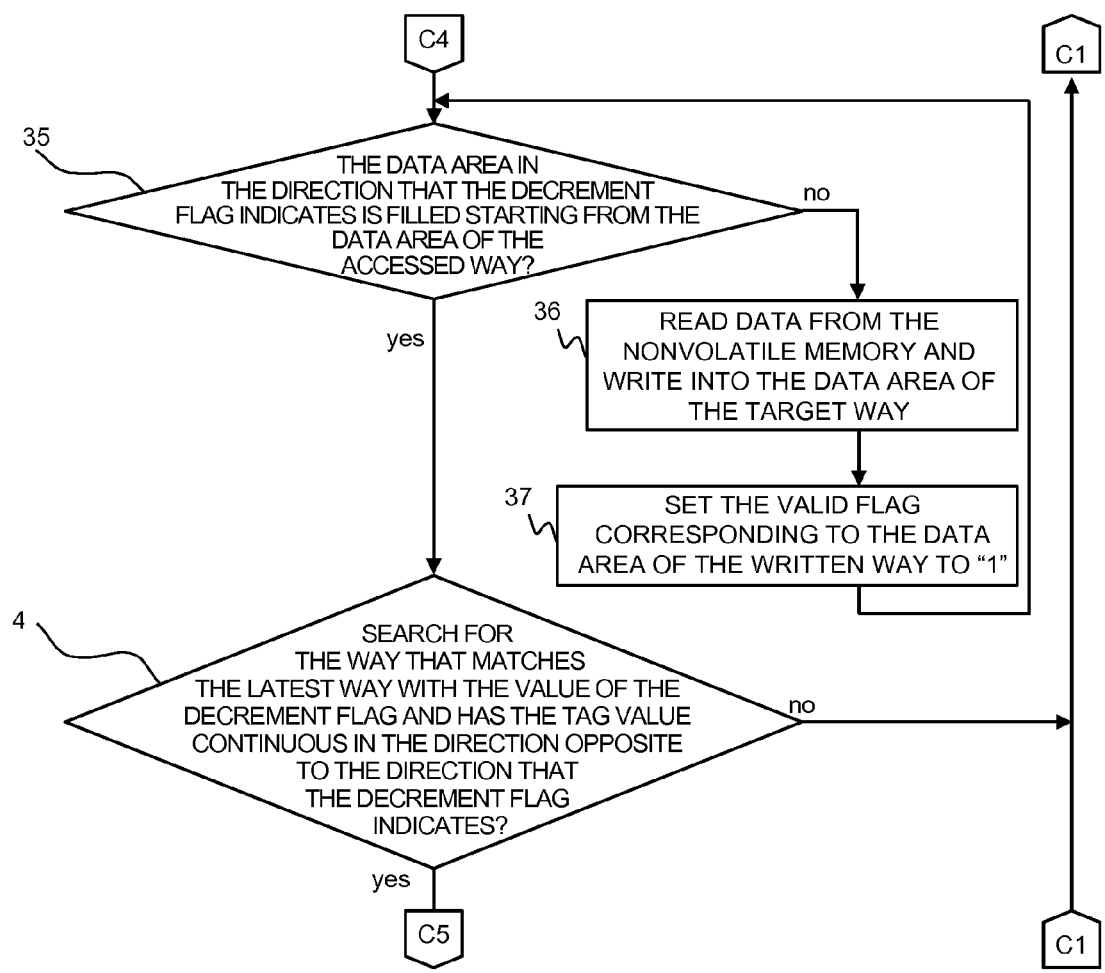
FIG. 5 is a flow chart of a detailed operation example of a semiconductor device according to an embodiment (3/4)
Figure 6:
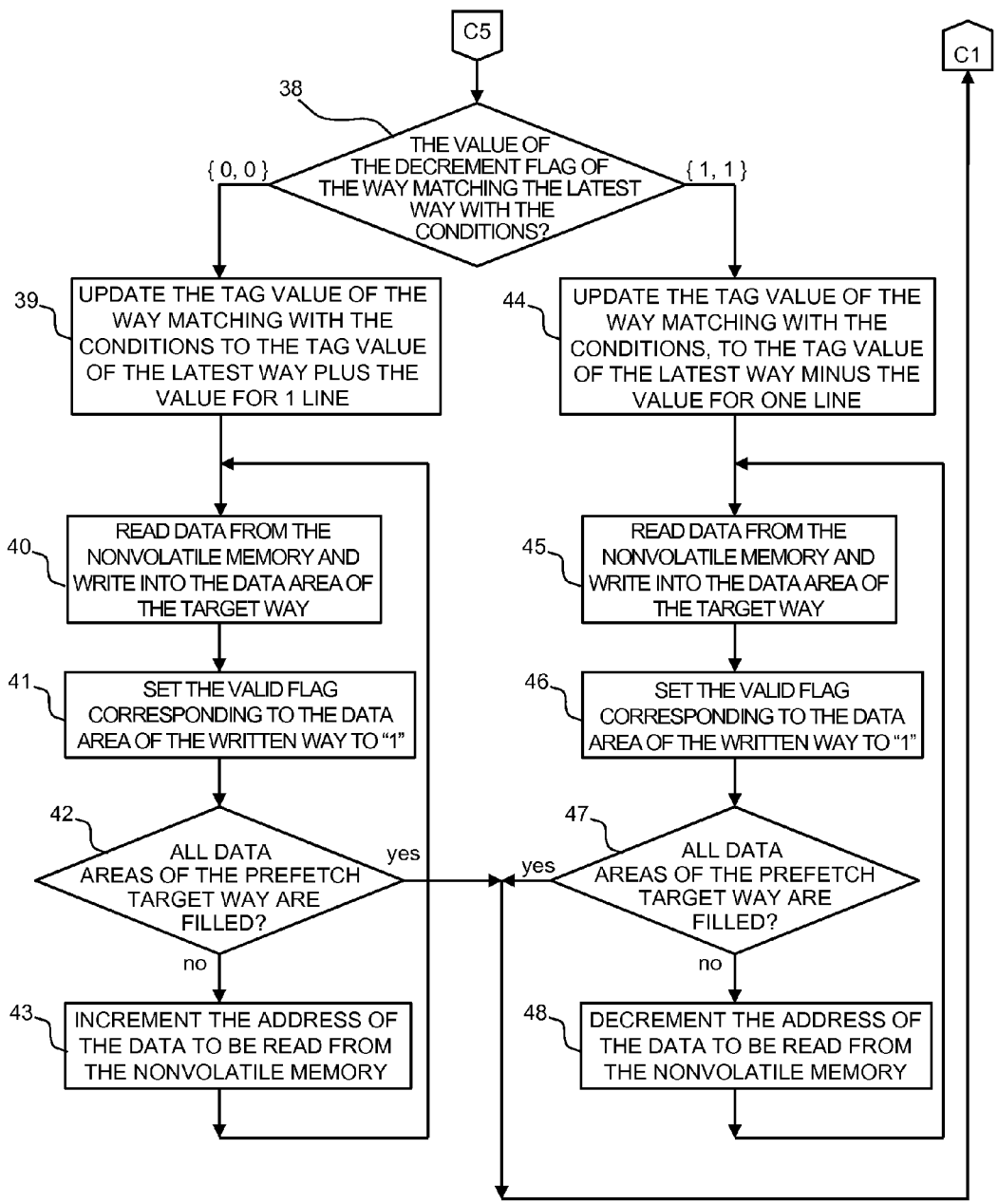
FIG. 6 is a flow chart of a detailed operation example of a semiconductor device according to an embodiment (4/4)

Also when proceeding to Step 3 to access the way via the connector 3 through Step 2 that gives the address change direction attribute to the way shown in FIG. 3, the cache controller 63 first determines whether or not it is a cache hit (Step 21). If it is a cache hit, the cache controller 63 updates the LRU flag 70 to make the hit way up to date (Step 33), and outputs the read data from the hit way (Step 34). Even if it is a cache miss, the cache controller 63 knows that there is a way having the tag value that is the same as the address of this read request. Thus, the cache controller 63 writes the data from the nonvolatile memory 55 in the data area of the target way (Step 29). This is the flow of the case in which although there is a way having the tag value that is the same as the address of the read request, the data of the address to be accessed is not valid (the valid flag is not set). The cache controller 63 reads the data from the nonvolatile memory 55 and writes into the data area of the target way (Step 29). Then, the cache controller 63 sets the valid flag corresponding to the data area of the way in which the data is written, to 1 (Step 30). Next, the cache controller 63 sets the address to be accessed to the tag of the way in which the data is written (Step 26), and updates the LRU flag 70 so that the way in which the data is written is up to date (Step 27). Then, the cache controller 63 outputs the read data from the way in which the data is written (Step 28). As described above, the cache controller 63 proceeds to the step of determining whether there is a way appropriate for prefetch, which is shown in FIG. 5, via the connector C4, regardless of whether this read request is a cache hit or miss.

First, the cache controller 63 determines whether or not the data area in the direction that the decrement flag indicates has been filled, starting from the data area of the accessed way (Step 35). If the decrement flag of the accessed way is 0, the cache controller 63 checks whether there is a valid flag cleared to 0 out of the flags in the direction in which the address is incremented from the accessed data area. If the decrement flag of the accessed way is 1, the cache controller 63 checks whether there is a valid flag cleared to 0 out of the valid flags in the direction in which the address is decremented from the accessed data area. If there is a data area having the valid flag that is not set to 1, the cache controller 63 reads the data from the nonvolatile memory 55 and writes into the data area of the target way (Step 36).

Then, the cache controller 63 sets the valid flag 70 corresponding to the data area of the way in which the data is written, to 1 (Step 37). This operation is repeated until valid data is written (filled) in all the data areas, from the access data area to the end of the way in the direction that the decrement flag indicates.

Next, the cache controller 63 searches for a way that matches the latest way with the value of the decrement flag, and has the tag value continuous in the direction opposite to the direction that the decrement flag indicates (Step 4). If not present, the cache controller 63 returns to Step 11 to determine the presence or absence of the data read to the nonvolatile memory 55 (which is shown as the flow connected by the connector C1 in the figures). On the other hand, if the way 64 meeting such conditions is present, the cache controller 63 proceeds to the step of performing prefetching of data shown in FIG. 6 via the connector C5.

First, the cache controller 63 checks the value of the decrement flag of the way that matches the latest way with the conditions described above (Step 38). If the value of the decrement flag of the latest way and the value of the decrement flag of the way meeting the above conditions are both 0, the cache controller 63 proceeds to Step 39. The way meeting the above conditions is the way that is determined to be the way appropriated for writing the prefetched data. The cache controller 63 updates the tag value of the way, which matches with the conditions, to the tag value of the latest way plus the value for one line (Step 39). If all the data areas of the prefetch target way are not filled in the direction that the decrement flag indicates, namely, in the direction in which the address is incremented, the cache controller 63 increment the address of the data to be read from the nonvolatile memory (Step 43). Then, the cache controller 63 transfers the next data from the nonvolatile memory 55 (Step 40), and sets the valid flag of the corresponding data area to 1 (Step 41). The operation from Step 40 to Step 43 is repeated until all the data areas of the prefetch target way are filled in the direction that the decrement flag indicates (Step 42).

The cache controller 63 checks the value of the decrement flag of the way that matches the latest way with the above conditions (Step 38). If the value of the decrement flag of the latest way and the value of the decrement flag of the way meeting the above conditions are both 1, the cache controller 63 proceeds to Step 44. Also the way meeting the conditions is the way that is determined to be the way appropriate for writing the prefetched data. The cache controller 63 updates the tag value of the way, which matches with the conditions, to the tag value of the latest way minus the value for one line (Step 44). If all the data areas of the prefetch target way are not filled in the direction that the decrement flag indicates, namely, in the direction in which the address is decremented, the cache controller 63 decrements the address of the data read from the nonvolatile memory (Step 48). Then, the cache controller 63 transfers the next data from the nonvolatile memory 55 (Step 45), and sets the valid flag 67 of the corresponding data area to 1 (Step 46). The operation from Step 45 to Step 48 is repeated until all the data areas of the prefetch target way are filled in the direction that the decrement flag indicates (Step 47).

If all the data areas of the prefetch target way are filled (Steps 42, 47), the cache controller 63 returns to Step 11 to determine the presence or absence of the data read to the nonvolatile memory 55 (which is shown as the flow connected by the connector C1 in the figures).

As described above, if there is a way appropriate for writing the prefetched data, the way is used for writing the prefetched data with respect to the access target way. Then, the continuous access continues in this state in the direction that the decrement flag 66 indicates. At the time when the prefetch target way is changed to the access target, the way that was the access target meets the conditions under which the way is appropriate for writing the prefetched data. It is possible to continue prefetching by replacing the relationship of access target and prefetch target between the two ways. This is because the cache controller 63 is designed to proceed to the step of determining the way appropriate for writing the next prefetch data, regardless of whether it is a cache miss or cache hit in Step 3, so that the prefetch is performed even if cache hit continues.

As shown in the present embodiment, even if the data cache is configured with 4 ways, the cache controller 63 can be allowed to operate to continuously have cache hit with at least two ways, upon the continuous access to a series of data as described above. In other words, it is possible to combine the two ways to function as one way to continue prefetching in such a way that overhead does not occur due to a cache miss. At this time, the 2 ways autonomously return to two independent ways when they do not meet the conditions any more. When the whole is configured with 4 ways, the other 2 ways are allowed to function as 1 way to continue prefetching or to function as 2 independent ways. Switching between functioning as one way to continue prefetching and functioning as two independent ways is performed only by the comparison between the decrement flag and the tag value. In general, the determination of whether or not to perform prefetching of data is made based on the access history. In the present embodiment, by focusing on the fact that the tag value reflects the access history, it is possible that the cache controller autonomously determines and switches without control from the outside, only by providing a new decrement flag that indicates the direction.

Operation Example

Figure 7:
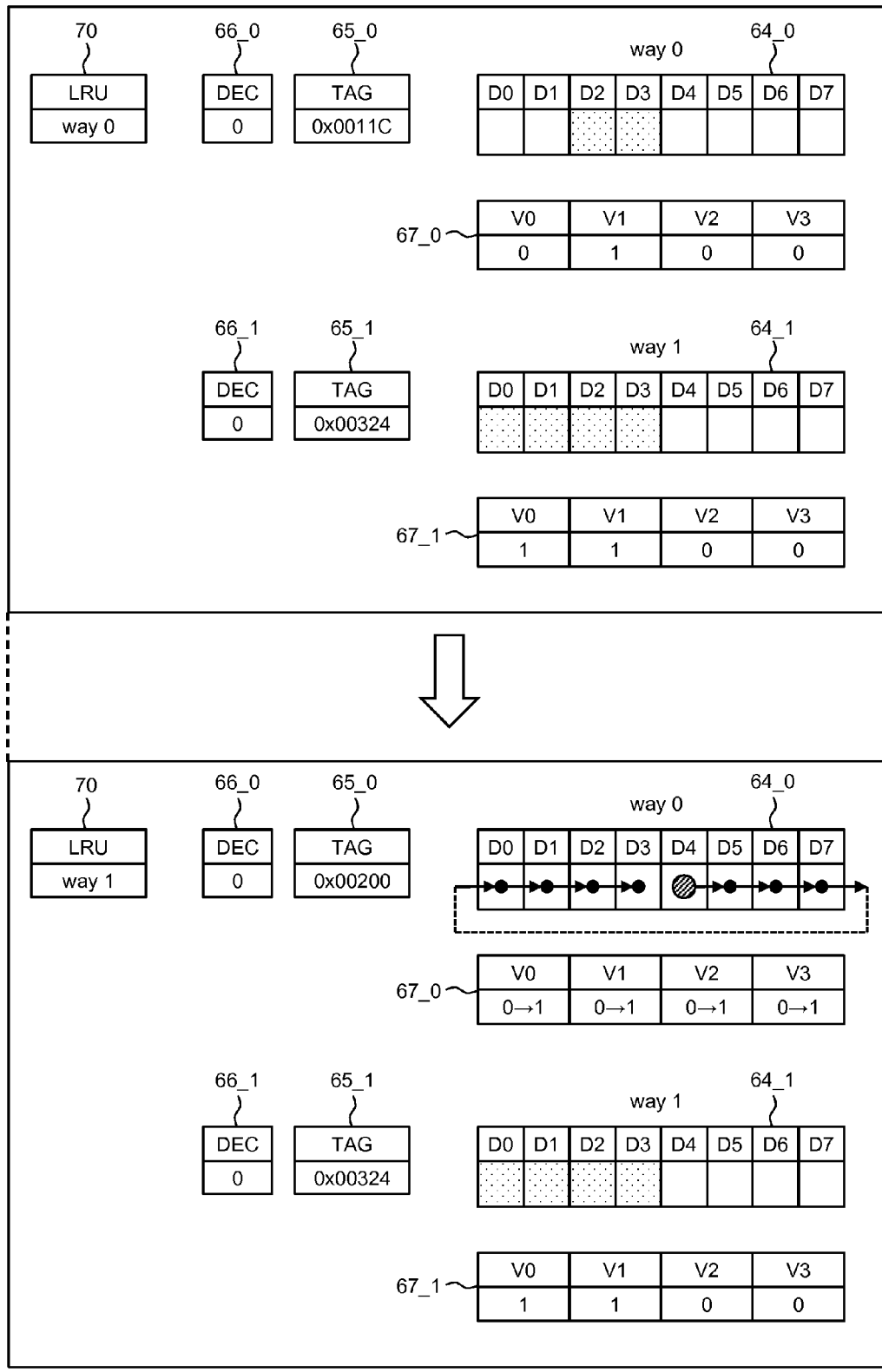
FIG. 7 is a schematic diagram showing an operation example in which 2-way caches operate independently of each other according to an embodiment.
Figure 8:
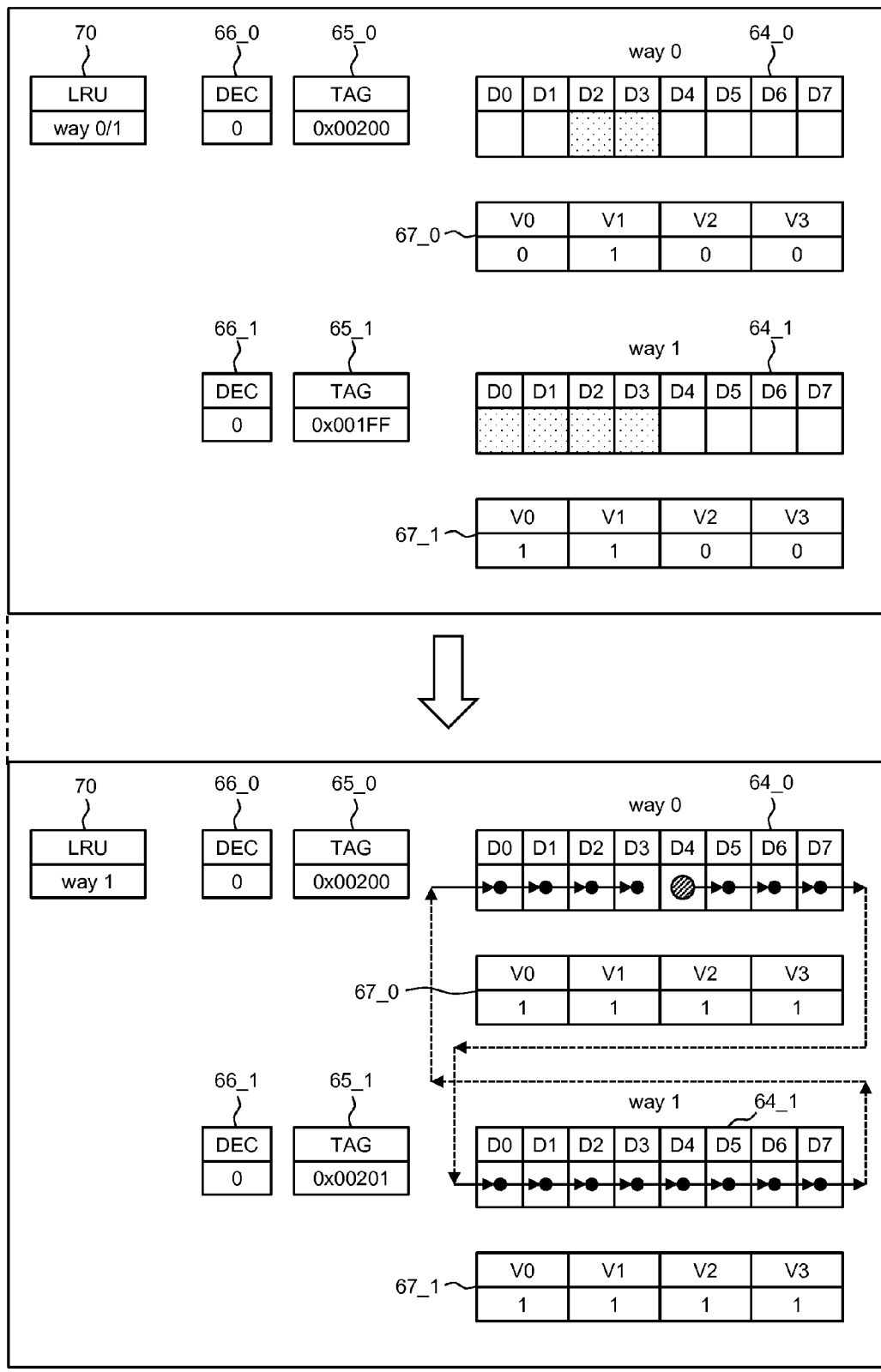
FIG. 8 is a schematic diagram showing an operation example when prefetching is performed in the direction in which the address is incremented (decrement flag=0) in such a way that 2-way caches function as prefetch targets for each other to function as one way according to an embodiment.
Figure 9:
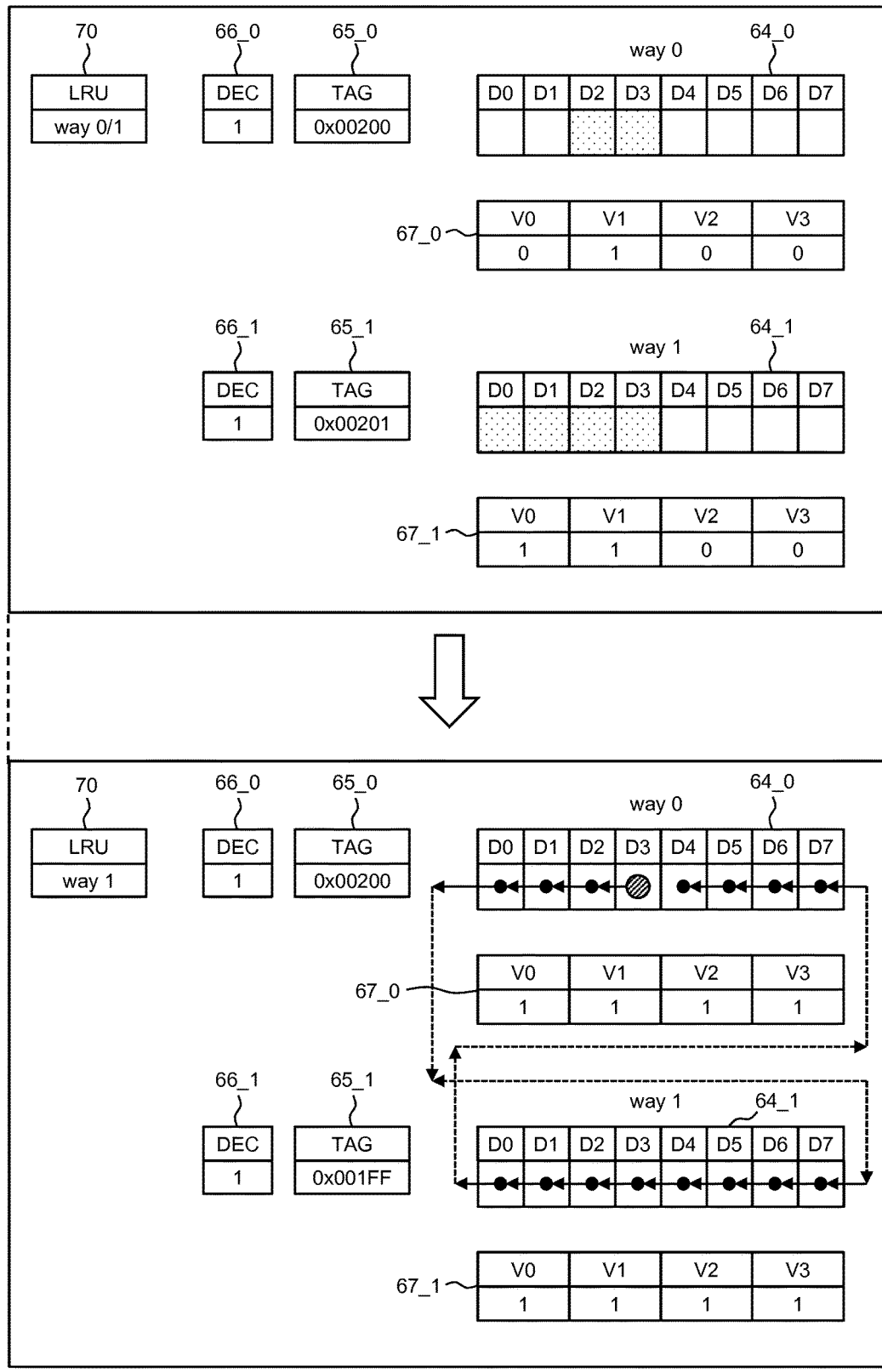
FIG. 9 is a schematic diagram showing an operation example when prefetching is performed in the direction in which the address is decremented (decrement flag=1) in such a way that 2-way caches function prefetch targets for each other to function as one way according to an embodiment.

An operation example of the present embodiment will be described. FIG. 7 is a schematic diagram showing an operation example in which 2-way caches operate independently. FIG. 8 is a schematic diagram showing an operation example when prefetching is performed in the increment direction of the address (decrement flag=0) in such a way that 2-way caches function as prefetch targets for each other to function as one way. FIG. 9 is a schematic diagram showing an operation example when prefetching is performed in the decrement direction of the address (decrement flag=1) in such a way that 2-way caches function as prefetch targets for each other to function as one way. In each of the operation examples, it is assumed that the number of ways is two. However, even if the number of ways is three or more, they can operate in the same manner as described above. The two ways 64_0 and 64_1 store eight data D0 to D7 of 2 bytes, respectively, and have the corresponding tags 65_0 and 65_1 as well as the corresponding decrement flags 66_0 and 66_1, respectively. The valid flags V0 to V3 of 1 bit are provided for two data (4 bytes). The LRU flag 70 shows the least recently accessed way, WAY 0 or WAY 1. The address is set in such a way that one address is assigned to data of 1 byte. The eight 2-byte data D0 to D7 correspond to the data for 16 addresses. The tag stores the upper address value than lower 4 bits as the tag value. D0 stores data corresponding to the address in which 0x0 is added to the lower 4 bits in the lower part of the tag value, based on the tag value. Each of D2, D3, D4, . . . D7 stores data corresponding to each of the addresses in which 0x2, 0x4, 0x8 . . . 0xE are added to the tag values, respectively. FIGS. 7, 8, and 9 show examples in which a data read at address 0x002008 is requested, respectively, schematically showing the state before access on the upper side as well as the state after access on the lower side. The tag value corresponding to the address 0x002008 is 0x00200, and the data of the address 0x002008 is stored at the location of D4. Here, "0x" is the symbol showing that the subsequent number is hexadecimal.

In FIG. 7, only D2 and D3 of the way 0 (64_0) are valid before the access. The valid flag V1 is set to 1 and the other valid flags V0, V2, V3 are cleared to 0. The tag 65_0 stores 0x0011C. With respect to the way 1 (64_1), D0, D1, D2, D3 are valid, in which 1 is set to the valid flags V0, V1 and the other valid flags V2 and v3 are cleared to 0. The tag 65_1 stores 0x00324.

When the data read at address 0x002008 is requested, it is not hit in either of the ways. The tag value corresponding to the address 0x002008 is 0x00200, which is different from the tag values stored in the tags 65_0 and 65_1. Thus, it is determined to be a cache miss (Step 17, Step 22). The LRU flag 70 indicates the way 0, so that the cache controller 63 performs a cache fill with respect to the way 0 (Steps 23 to 28). The cache controller 63 clears all the valid flags V0 to V3 of the way 0 (64_0) to 0 (Step 23). The cache controller 63 reads data from the address 0x002008 of the nonvolatile memory, and writes into D4 and D5 of the way 0 (64_0) (Step 24). The cache controller 63 sets the corresponding valid flag V2 to 1 (Step 25), and then sets the tag 65_0 to 0x00200 (Step 26). The cache controller 63 changes the LRU flag to WAY 1 (Step 27). The cache controller 63 outputs the data from D4 of the way 0 (64_0) in which the cache fill is performed (Step 28). After that, the data prefetch proceeds to D6 and D7. When the data prefetch is performed, V3 of the valid flag 67_0 is set to 1. Upon completion of the prefetch in the direction in which the address is incremented that the decrement flag 66_0 indicates, the condition determination of Step 4 is performed. The decrement flags 66_0 and 66_1 match in the increment direction. The tag 65_1 of the way 1 is 0x00324, which is different from the tag value 0x001FF continuous with the tag value 0x00200 of the way 0 in the decrement direction opposite to the direction that the decrement flags 66_0 and 66_1 indicate. As a result, it is determined that the way 1 is not appropriate for the prefetch target (Step 4). The data of the way 1 (64_1) is stored. If there is an access to the data D0 to D3 that are valid and match the tag 65_1, a cache hit occurs. The way 1 (64_1) functions as a way independent of the way 0 (64_0).

When the cache fill is performed in D4 and D5 of the way 0 (64_0) and the prefetched data is written in D6 and D7, the valid flags V0 and V1 of D0 to D3 of the way 0 (64_0) remain cleared to 0. After that, the data of D0 to D3 of the way 0 (64_0) are read in Steps 12, 13, and 14 by using free cycles. The data of D0 to D3 are data in the direction opposite to the direction in which the address is incremented that the decrement flag 66_0 indicates, as seen from the data of the address 0x002008 at which the cache fill is performed. By previously reading data in the direction opposite to the prefetch direction into the cache by using free cycles, it is possible to have a cache hit as long the data is within the same way, even when the state of the continuous access is lost and when the access is performed in the address direction opposite to the continuous direction. As a result, the probability of cache misses can be reduced.

In FIG. 8, only D2 and D3 of the way 0 (64_0) are valid before the access, in which the valid flag V1 is set to 1 and the other valid flags V0, V2, V3 are cleared to 0. The tag 65_0 stores 0x00200. As for the way 1 (64_1), D0, D1, D2, and D3 are valid. The valid flag V0 and V1 are set to 1 and the other valid flags V2 and V3 are cleared to 0. The tag 65_1 stores 0x001FF.

When a data read at address 0x002008 is requested, it is hit in the way 0. The tag value corresponding to the address 0x002008 is 0x00200, which matches the tag value stored in the tag 65_0, so that the decrement flag is updated (Steps 17 to 20). If the address of the continuous access is in the increment direction, the value of the decrement flag 66_0 is set to 0 (Step 19), and if in the decrement direction, the value of the decrement flag 66_0 is set to 1 (Step 20). In FIG. 8, it is assumed that the address is in the increment direction.

Next, the cache controller 63 determines a cache hit/miss (Step 21). V2 of the valid flag D4 in which data that matches the tag 65_0 but corresponds to the address 0x002008 should be stored is 2, so that the data corresponding to the address 0x002008 is not stored in the way 0 (64_0). Thus, it is determined to be a cache miss. The cache controller 63 reads data of 4 bytes at address 0x002008 from the nonvolatile memory 55 and writes the data into D4 and D5 (Step 29), and then sets the V2 of the corresponding valid flag 67_0 to 1 (Step 30). The cache controller 63 updates the LRU flag 70 to WAY 1 so that the accessed way 0 is up to date (Step 31). Then, the cache controller 63 outputs the data from D4 of the way 0 (64_0) in which the cache fill is performed (Step 32).

After that, the data prefetch proceeds to D6 and D7. When the data prefetch is performed, V3 of the valid flag 67_0 is set to 1. When the prefetch is completed in the direction in which the address is incremented that the decrement flag 66_0 indicates, the cache controller 63 performs the condition determination of Step 4. The value of the tag 65_1 of the way 1 is 0x001FF, which matches the tag value 0x001FF continuous with the tag value 0x00200 of the way 0 in the direction opposite to the direction in which the address is incremented that the decrement flag 66_0 and decrement flag 66_1 indicate. Thus, it is determined that the way 1 is appropriate for the prefetch target (Step 4). The decrement flag 66_0 of the way 0 which is the latest way, and the decrement flag 66_1 of the way 1 meeting the conditions as the prefetch target are both 0 and match each other (Step 38). The cache controller 63 updates the value of the tag 65_1 of the way 1 meeting the conditions as the prefetch target to 0x00201, which is equal to the tag value 0x00200 of the tag 65_0 of the latest way 0 plus 1 (Step 39). Then, the cache controller 63 sequentially reads data from the nonvolatile memory 55, writes data of addresses 0x002010 to 0x00201F (Step 40), and updates V0 to V3 of the corresponding valid flag 67_1 sequentially to 1 (Step 41), while incrementing the address (Step 43) until all the data D0 to D7 of the way 1 are filled (Step 42). In this way, the way 1 functions as the prefetch target for the way 0. After that, the way 0 and the way 1 alternately function as the access target and the prefetch target as long as the continuous access continues, and thus the cache miss will not occur.

After the prefect to D0 to D7 of the way 1 (64_1) is completed, if the access from the CPU 53 is still to the way 0 and there is a space in the access cycle, it may also be possible to read data into the way 0 (64_0) in the direction opposite to the prefetch direction in advance by Steps 12, 13, and 14, in the same way as described above with reference to FIG. 7. In this way, even if the prefetch operation is performed over the 2 ways, it is possible to perform prefetching in the same way backward (in the address direction opposite to the continuous direction), in such a way that the probability of cache misses is reduced, even when the state of the continuous access is lost and when the access is performed in the address direction opposite to the continuous direction.

FIG. 9 shows an operation example when the direction of the continuous access is the direction in which the address is decremented. Only D2 and D3 of the way 0 (64_0) are valid before the access, so that the valid flag V1 is set to 1 while the other valid flags V0, V2, V3 are cleared to 0. The tag 65_0 stores 0x00200. As for the way 1 (64_1), D0, D1, D2, and D3 are valid, so that the valid flags V0 and V1 are set to 1 while the other valid flags V2 and V3 are cleared to 0. The tag 65_1 stores 0x00201. Both the decrement flags 66_0 and 66_1 are set to 1.

An example in which a data read at address 0x002006 is requested will be described. When a data read at address 0x002006 is requested, it is hit in the way 0. The tag value corresponding to the address 0x002006 is 0x00200, which matches the tag value stored in the tag 65_0, so that the decrement flag is updated (Steps 17 to 20). As the address of the continuous access is in the decrement direction, the value of the decrement flag 66_0 is set to 1 (Step 20). V1 of the valid flag 67_0 of D2, in which data that matches the tag 65_0 and corresponds to the address 0x002006 should be stored is 1, so that the data corresponding to the address 0x002006 is stored in the way 0 (64_0). Thus, it is determined to be a cache hit (Step 21). The cache controller 63 updates the LRU flag 70 (Step 33), and outputs the data from D2 of the hit way 0 (64_0) (Step 34).

After that, the data prefetch proceeds to D0 and D1. When the data prefetch is performed, V0 of the valid flag 67_0 is set to 1. When the prefetch is completed in the direction in which the address is decremented that the decrement flag 66_0 indicates, the cache controller 63 performs the condition determination of Step 4. The value of the tag 65_1 of the way 1 is 0x00201, which matches the tag value 0x00201 continuous with the tag value 0x00200 of the way 0 in the direction opposite to the direction in which the address is decremented that the decrement flags 66_0 and 66_1 indicate. Thus, it is determined that the way 1 is appropriate for the prefetch target (Step 4). The decrement flag 66_0 of the way 0 which is the latest way, and the decrement flag 66_1 of the way 1 meeting the conditions as the prefetch target are both 1 and match each other (Step 38). The cache controller 63 updates the value of the tag 65_1 of the way 1 meeting the conditions as the prefetch target to 0x001FF, which is equal to the tag value 0x00200 of the tag 65_0 of the latest way 0 minus 1 (Step 44). Then, the cache controller 63 sequentially reads data from the nonvolatile memory 55, writes the data of addresses 0x001FFF to 0x001FF0 into the data D0 to D7 of the way 1 (Step 45), and updates V0 to V3 of the corresponding valid flag 67_1 sequentially to 1 (Step 46), while incrementing the address (Step 48) until all the data D0 to D7 of the way 1 are filled (Step 47). In this way, the way 1 functions as the prefetch target for the way 0, similar to the case of the continuous access in the direction in which the address is incremented as described above with referring FIG. 8. After that, the way 0 and the way 1 alternately function as the access target and the prefetch target as long as the continuous access continues, and thus the cache miss will not occur.

After the prefetch to D0 to D7 of the way 1 (64_1) is completed, if there is a space in the access cycle before staring the access from the CPU 53 to the way 1 in which the prefetch is performed, it may also be possible to read the data D4 to D7 in advance in the direction opposite to the prefetch direction into the way 0 (64_0) by Steps 12, 13, 14, in the same way as described above with reference to FIG. 7. In this way, even when the prefetch is performed over two ways, similar to the case of the continuous access in the direction that the address is incremented, it is possible to perform prefetching in the same way backward (in the address direction opposite to the continuous direction), in such a way that the probability of cache misses is reduced, even when the state of the continuous access is lost and when the access is performed in the address direction opposite to the continuous direction.

[Operation Timing]

Operation examples of the present embodiment will be described more in detail using timing charts.

Figure 14:
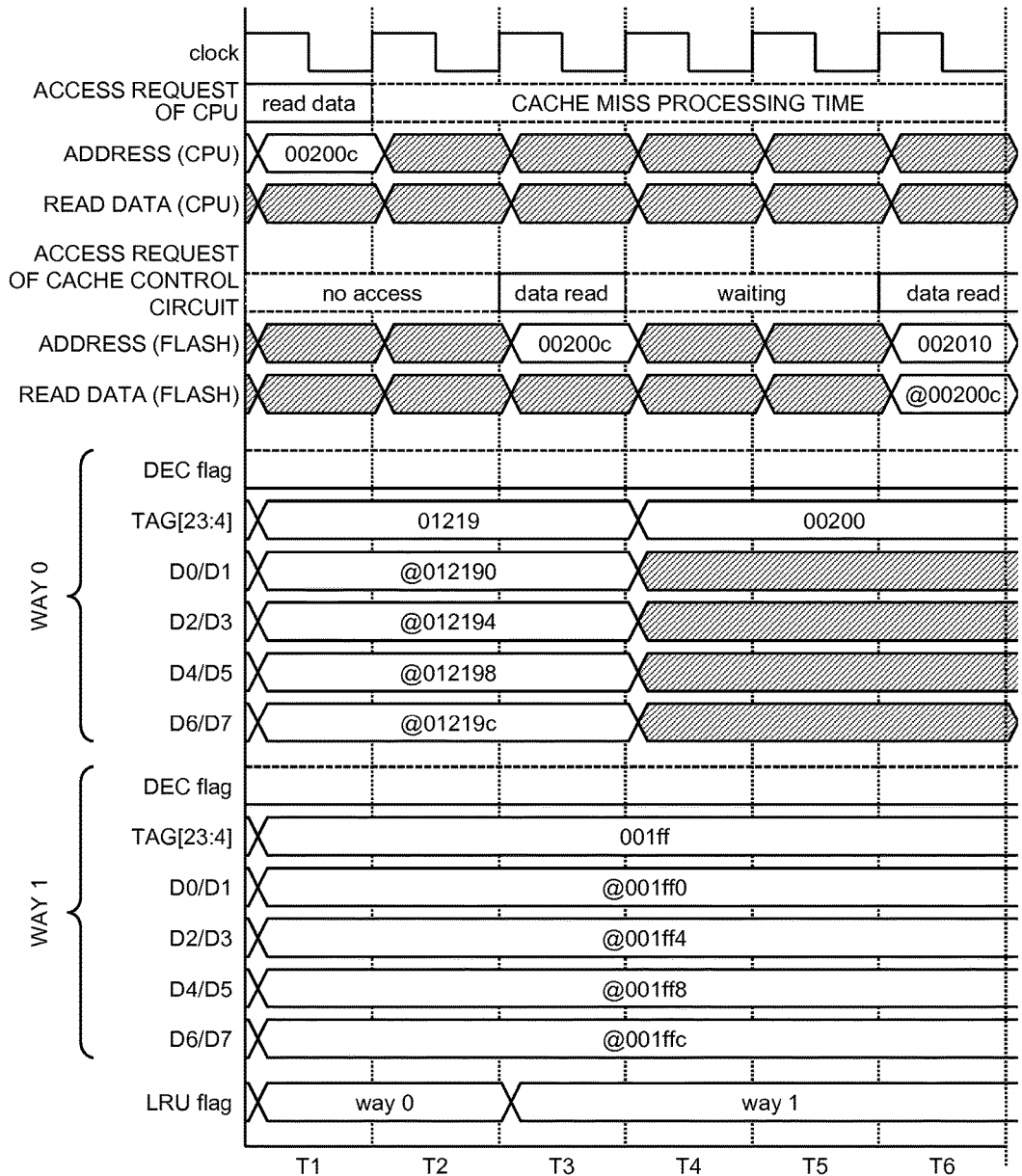
FIG. 14 is a timing chart of an operation example when prefetching is performed in such a way that 2-way caches function as prefetch targets for each other to function as one way (1/3)
Figure 15:
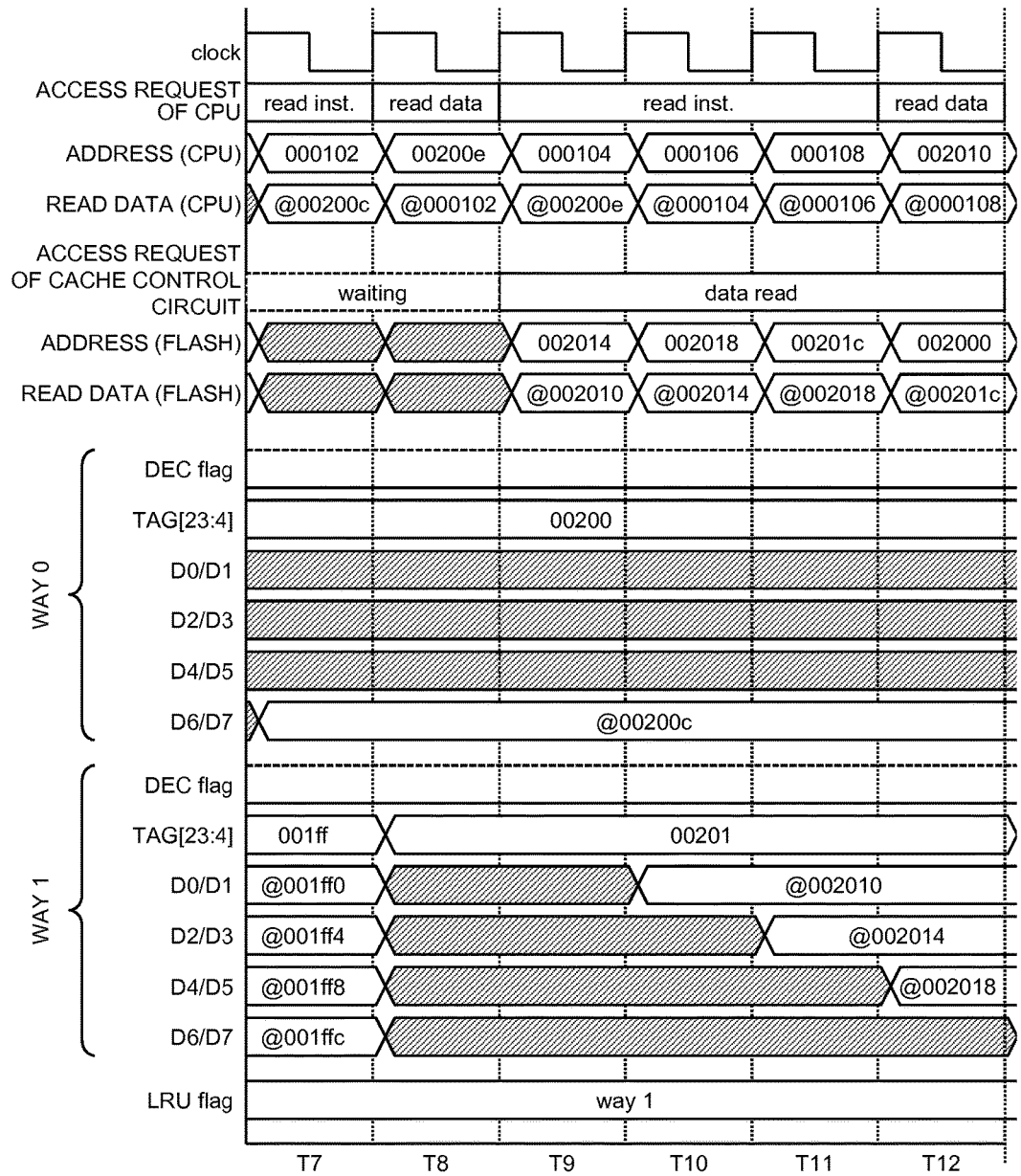
FIG. 15 is a timing chart of an operation example when prefetching is performed in such a way that 2-way caches function as prefetch targets for each other to function as one way (2/3)
Figure 16:
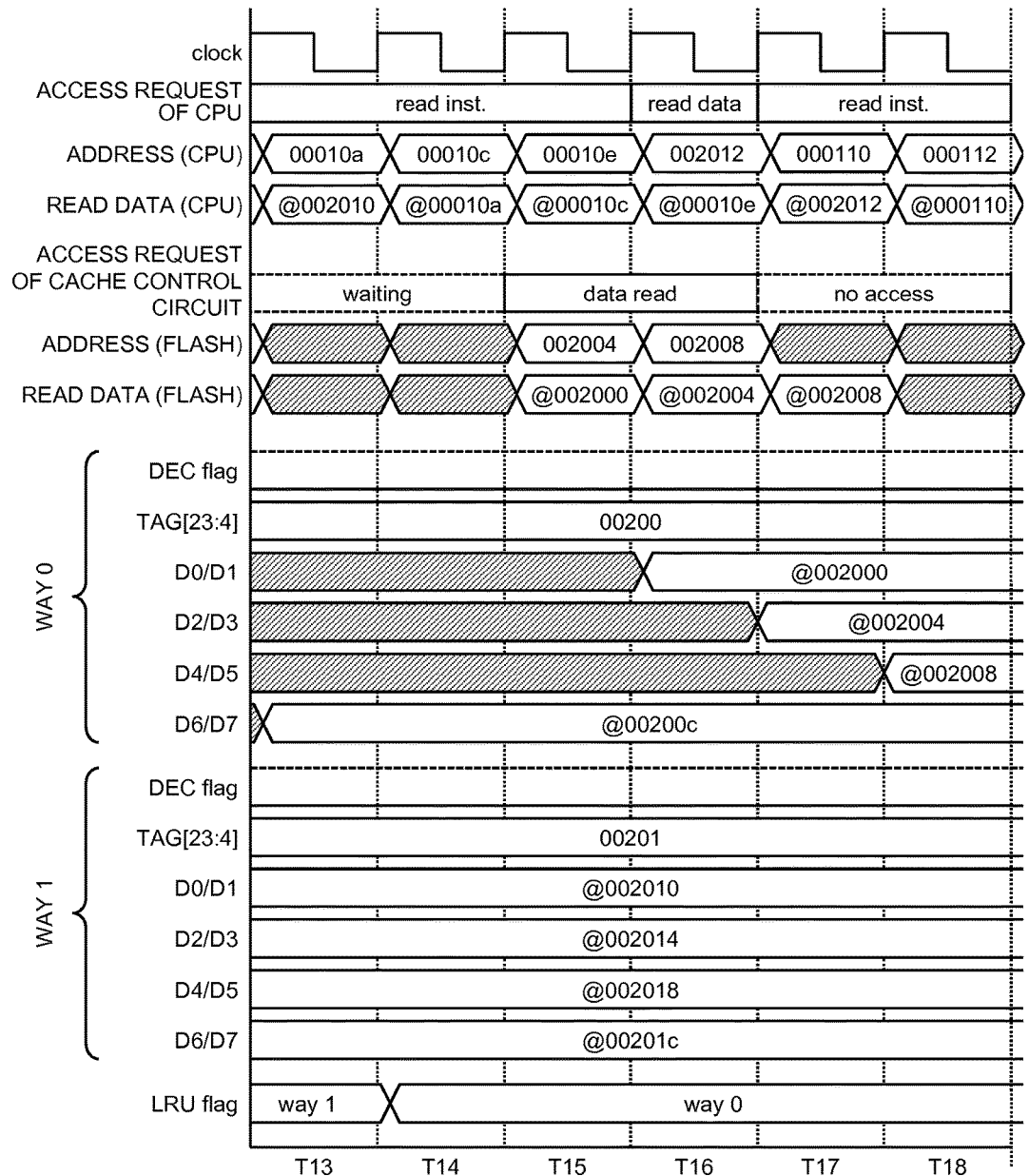
FIG. 16 is a timing chart of an operation example when prefetching is performed in such a way that 2-way caches function as prefetch targets for each other to function as one way (3/3)
Figure 17:
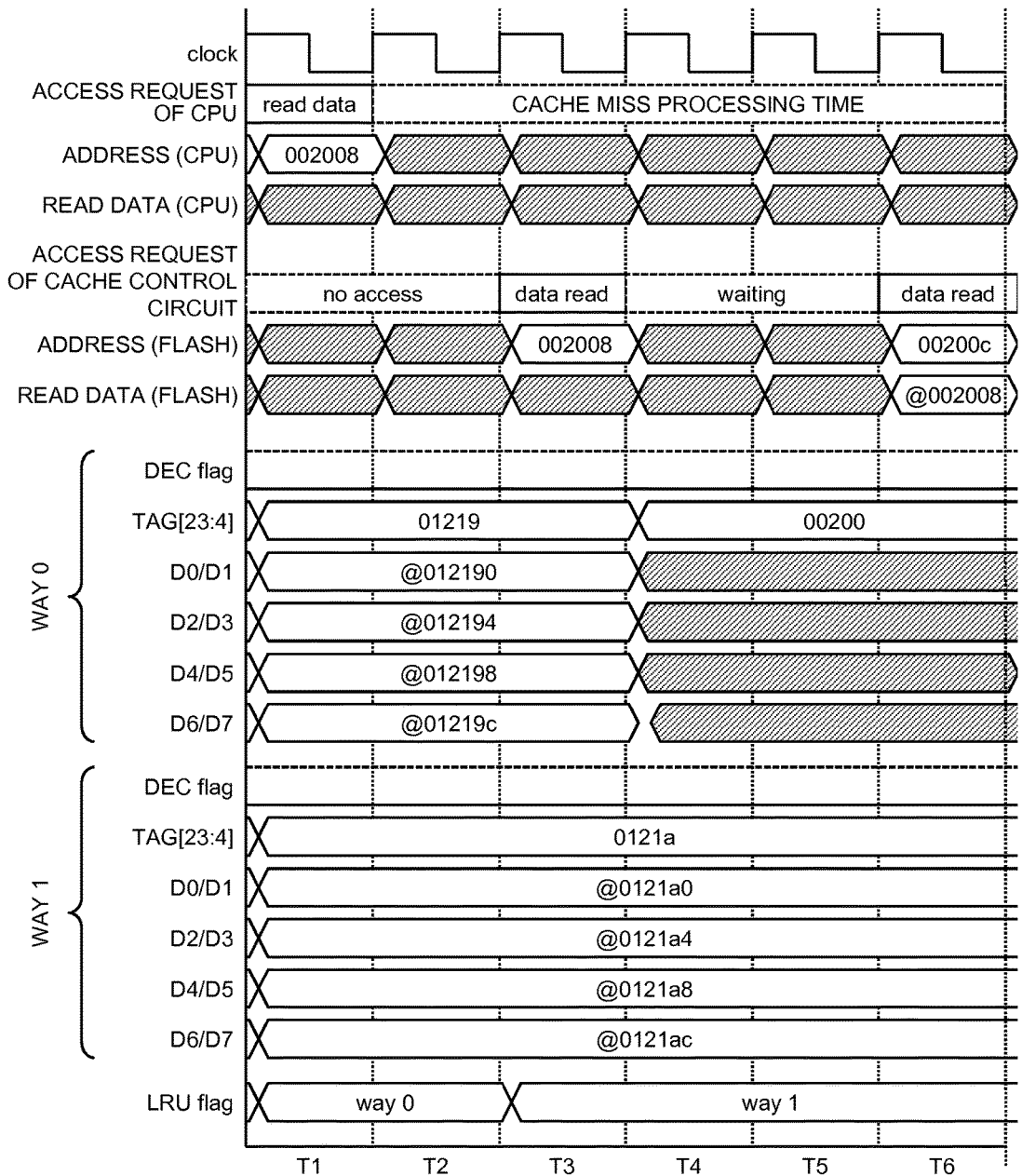
FIG. 17 is a timing chart of an operation example in which the 2-way caches operates independently of each other (1/2)
Figure 18:
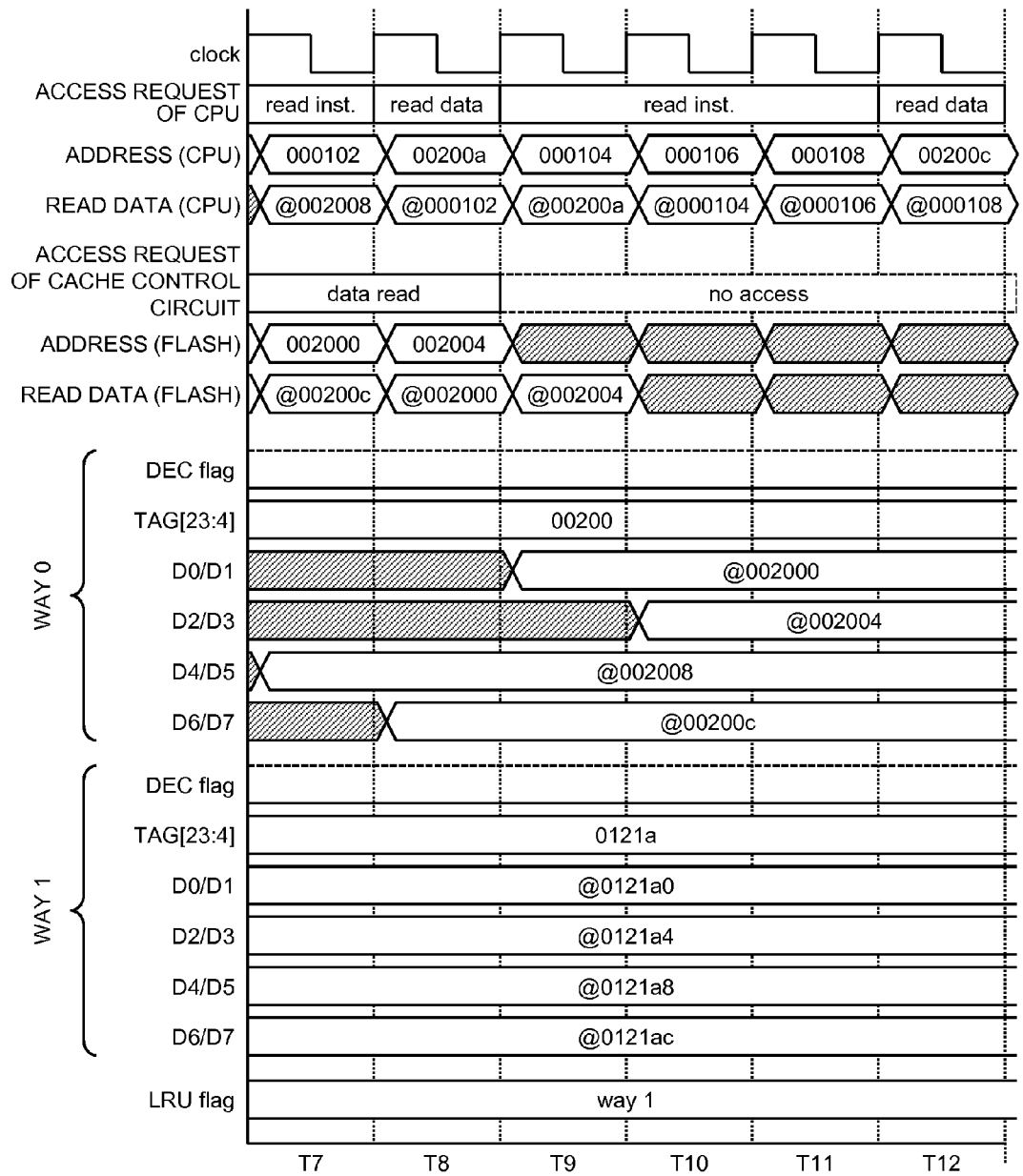
FIG. 18 is a timing chart of an operation example in which the 2-way caches operates independently of each other (2/2).

FIGS. 10 to 13 show a timing chart of an operation example of a semiconductor device according to a comparative example. FIGS. 14 to 16 show a timing chart of an operation example when prefetching is performed in such a way that 2-way caches function as prefetch targets for each other to function as one way. FIGS. 17 to 18 show a timing chart of an operation example in which the 2-way caches operate independently of each other. In each of the figures, the horizontal axis is the time axis in units of clock cycles from T1. The clock, the access request from the CPU, the address issued by the CPU, and the read data to the CPU are shown from the top in the vertical axis direction. Next, the operation of the cache memory 60 is shown. Then, the access request of the cache control circuit 63, the address issued to the nonvolatile memory 55 from the cache memory 60, and the read data output to the cache memory 60 from the nonvolatile memory 55 are shown. After that, the internal states of the way 0 and the way 1 are shown. The decrement flags 66_0 and 66_1, the values of the tags [23:4] (65_0 and 65_1), and the values of the data D0 to D7 are shown from the top with respect to each of the way 0 and the way 1. Then, the value of the LRU flag 70 is shown in the bottom.

Figure 10:
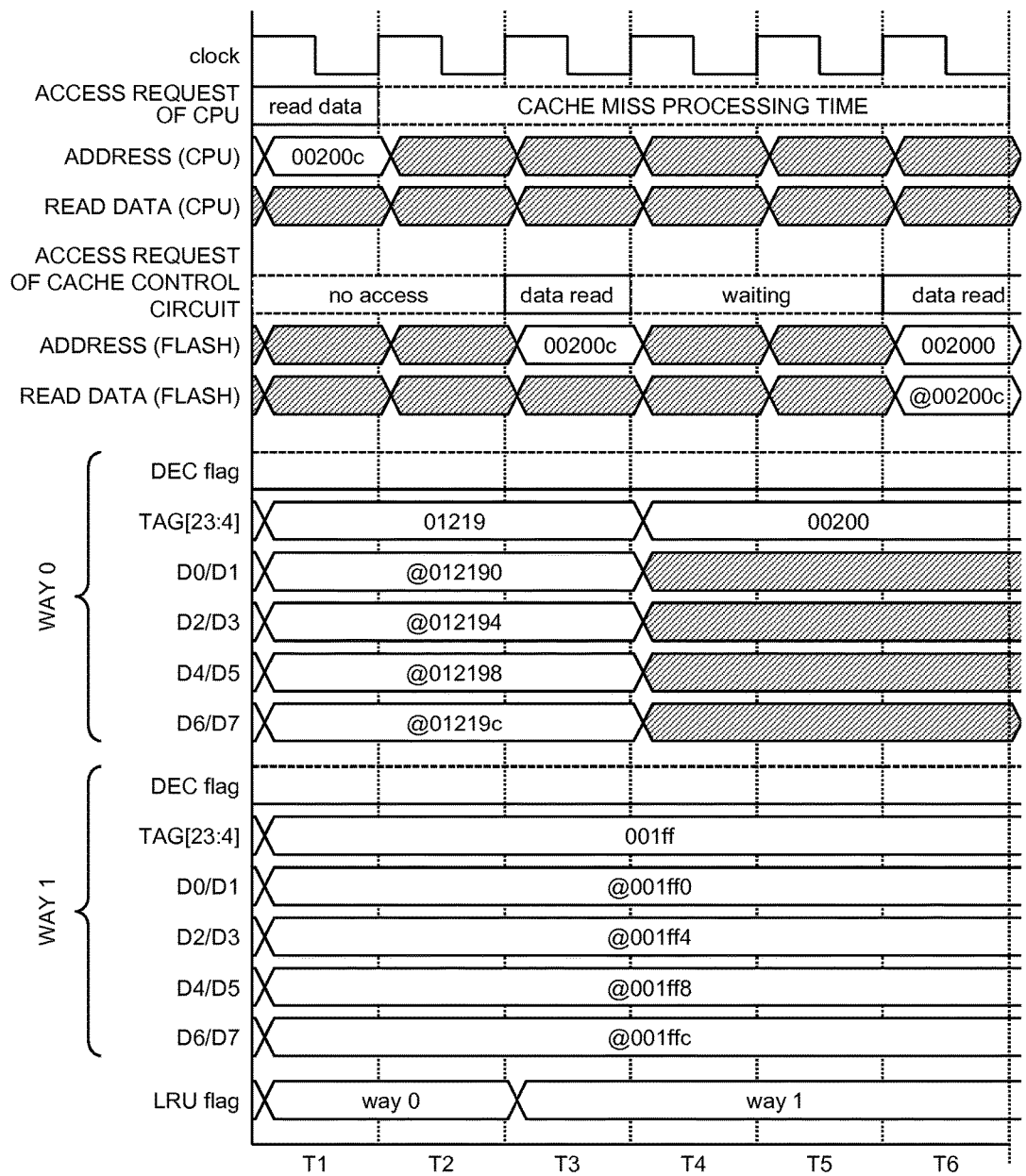
FIG. 10 is a timing chart of an operation example of a semiconductor device according to a comparative example (1/4)

In FIG. 10, the CPU 53 requests a data read of 2 bytes at address 0x00200C in the cycle T1. At this time, the value of the tag 65_0 of the way 0 is 0x01219, the value of the tag 65_1 of the way 1 is 0x001FF, and the LRU flag 70 indicates the way 0. There is no tag matching the tag value 0x00200 corresponding to the address 0x00200C at which the data read is requested, so that a cache miss occurs. When assuming that the determination of the cache miss requires 2 cycles, the cache memory 60 outputs the address 0x00200C to the nonvolatile memory 55 in cycle T3. The target of cache fill is the way 0 that the LRU flag 70 indicates. In cycle T3, the LRU flag 70 is updated to the way 1, and the tag 65_0 of the way 0 is updated to 0x00200 in cycle T4. The data read is performed in the nonvolatile memory 55, which is assumed to require 3 cycles. The value @00200C of the address 0x00200C is read in cycle T6. Then, the data is written into D6/D7 of the way 0 (64_0) in cycle T7, and at the same time, is output to the CPU 53. The cache fill is performed in units of 4 bytes. Thus, 4-byte data is written in D6 and D7 of the way 0 (64_0) at addresses 0x00200C to 0x00200F. The data read request from the CPU 53 is 2 bytes, so that 2 bytes stored in D6 are returned to the CPU 53.

Figure 11:
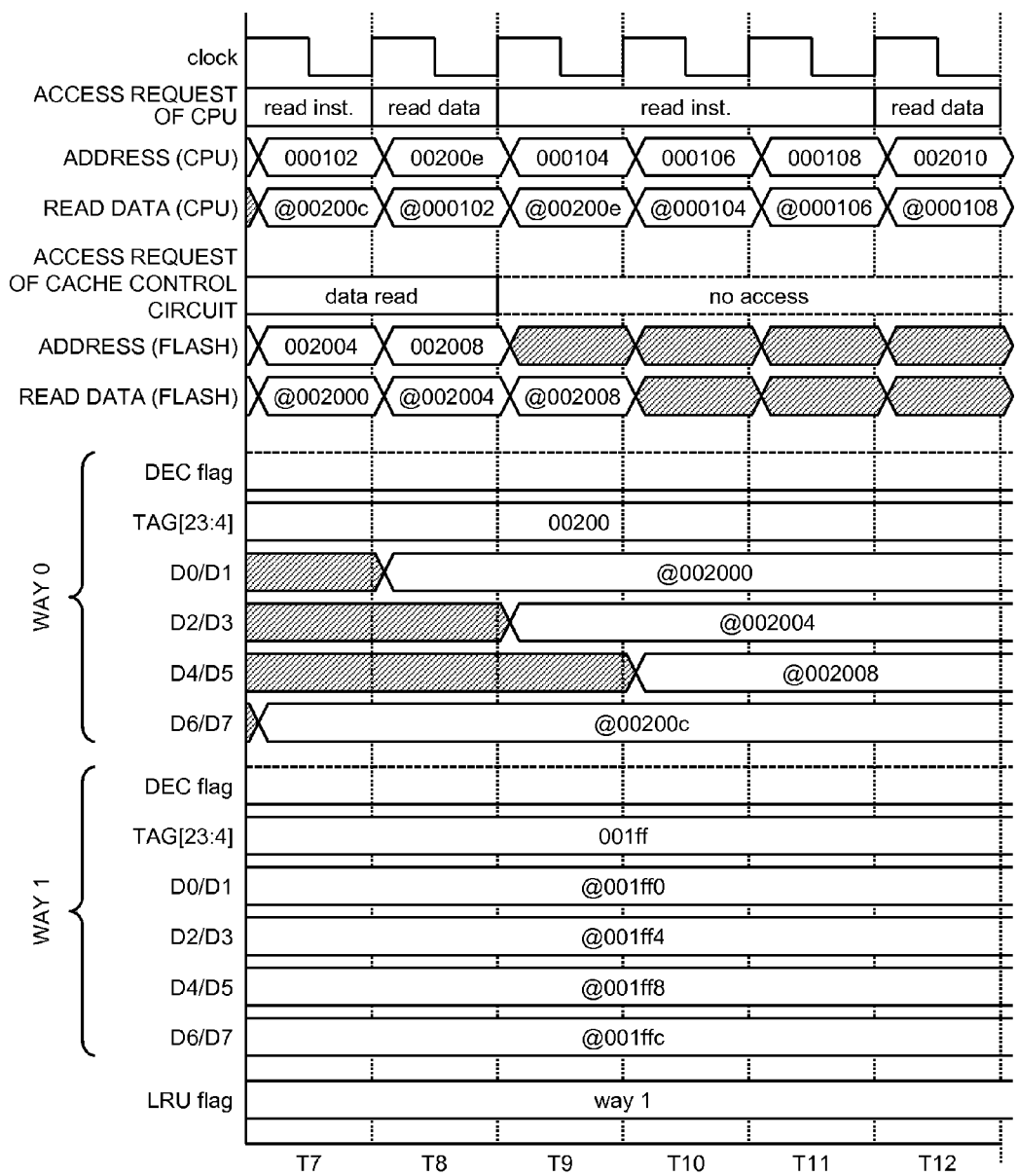
FIG. 11 is a timing chart of an operation example of a semiconductor device according to a comparative example (2/4)

In FIG. 11, the CPU 53 requests a data read of 2 bytes from the address 0x00200E in the cycle T8. The data of address 0x00200E is written into D7 of the way 0 (64_0) by the previously performed cache fill. The data read request in cycle T1 is the request of the data read of 2 bytes from the address 0x00200C, so that the data read request in cycle T1 is the request of continuous reading in the address increment direction. The decrement flag 66_0 of the way 0 is maintained with 0 that indicates the address increment direction. The data of the address 0x00200E is stored in D7 of the way 0 (64_0), which is a cache hit and is output as @00200E in cycle T9 as the read data of the CPU. The CPU 53 further requests a data read of 2 bytes from 0x002010 which is the next continuous address, in cycle T12. The data of the address 0x002010 is not cached, so that a cache miss occurs. The cache control circuit does not issue an access request until that time (cycles T9 to T13).

Figure 12:
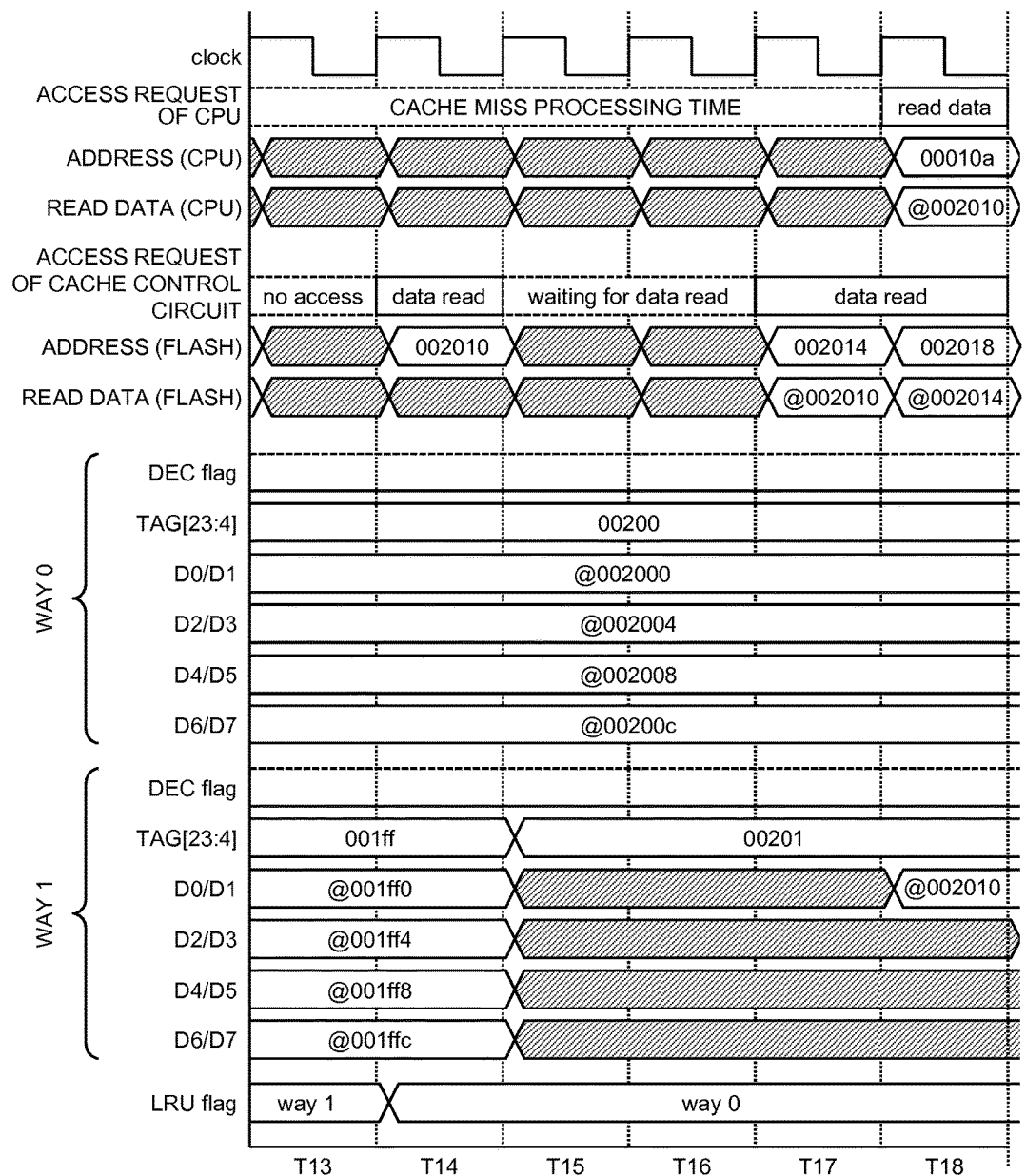
FIG. 12 is a timing chart of an operation example of a semiconductor device according to a comparative example (3/4)
Figure 13:
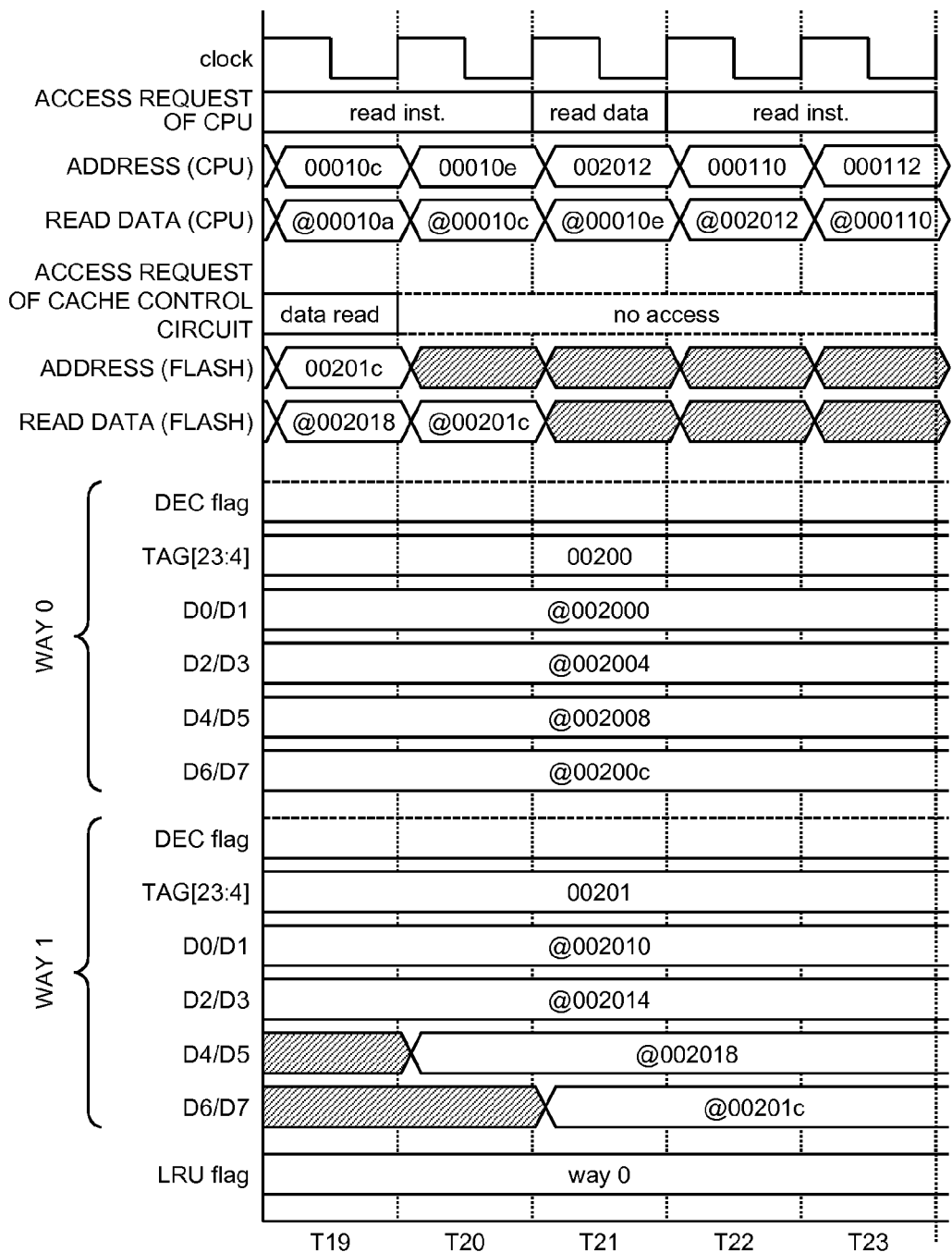
FIG. 13 is a timing chart of an operation example of a semiconductor device according to a comparative example (4/4)

In FIG. 12, the cache memory 60 outputs the address 0x002010 to the nonvolatile memory 55 in cycle T14. The target of cache fill is the way 1 that the LRU flag 70 indicates. The LRU flag 70 is updated to the way 0 in cycle T14, and the tag 65_1 of the way 1 is updated to 0x00201 in cycle T15. In the nonvolatile memory 55, data read is performed over 3 cycles. The value @002010 of the address 0x002010 is read in cycle T17, which is written in D0/D1 of the way 1 (64_1) in cycle T18 and is output to the CPU 53 at the same time.

As described above, if there is no prefetch function for the continuous access, a cache miss occurs at each boundary of the cache line. The cache miss processing time is overhead.

FIGS. 14 to 16 show a time chart of an operation example when prefetching is performed in such a way that 2-way caches function as prefetch targets for each other.

In FIG. 14, the CPU 53 requests a data read of 2 bytes from the address 0x00200C in cycle T1. At this time, the value of the tag 65_0 of the way 0 is 0x01219, and the value of the tag 65_1 of the way 1 is 0x001FF. The LRU flag 70 indicates the way 0. There is no tag matching the tag value 0x00200 corresponding to the address 0x00200c at which the data read is requested, so that a cache miss occurs. When assuming that the determination of the cache miss requires 2 cycles, the cache memory 60 outputs the address 0x00200C to the nonvolatile memory 55 in cycle T3. The target of the cache fill is the way 0 that the LRU flag 70 indicates. The LRU 70 is updated to the way 1 in cycle T3, and the tag 65_0 of the way 0 is updated to 0x00200 in cycle T4. The data read is performed in the nonvolatile memory 55, which is assumed to require 3 cycles. The value @00200C of the address 0x00200C is read in cycle T6. The data is written into D6/D7 of the way 0 (64_0) in cycle T7 shown in FIG. 15, and at the same time, is output to the CPU 53. The cache fill is performed in units of 4 bytes, so that the data of 4 bytes from the addresses 0x00200C to 0x00200F are written into D6 and D7 of the way 0 (64_0). The data read request from the CPU 53 is 2 bytes, so that 2 bytes stored in D6 are returned to the CPU 53.

In FIG. 15, the CPU 53 requests a data read of 2 bytes from the address 0x00200E in cycle T8. As the data read request in cycle T1 is a data read of 2 bytes from the address 0x00200C, the data read request in cycle T1 is a continuous read request in the address increment direction. The decrement flag 66_0 of the way 0 is maintained with 0 that indicates the address increment direction. The data of the address 0x00200E is written into D7 of the way 0 (64_0) by the previous cache fill. The data of the address 0x00200E is stored in D7 of the way 0 (64_0), so that it is a cache hit. The data is output as @00200E in cycle T9 as the read data of the CPU.

In parallel with the above, the data read operation shown in the flow charts of FIGS. 3 to 6 is started. After the cache fill occurred by the data read request of 2 bytes from the address 0x00200C in cycle T1, the data area in the direction that the decrement flag 66_0 indicates is filled starting from D6/D7 of the way 0 (Step 35). Thus, the data prefetch proceeds to the step of determining whether or not there is a way appropriate for the prefetch. The cache controller 63 searches for the way that matches the way 0, which is the latest way, with the value of the decrement flag, and that has the tag value continuous in the direction opposite to the direction that the decrement flag indicates (Step 4). The decrement flags 66_0 and 66_1 both show the address increment direction and they match each other. The tag value of the way 1 is 0x001FF, which is continuous with the tag value 0x00200 of the way 0 in the address decrement direction opposite to the direction that the decrement flags 66_0 and 66_1 indicate. Thus, it is determined that the way 1 is appropriate for the prefetch target. The way 1 is updated to 0x00201 which is obtained by adding 1 to 0x00200 of the tag 65_1 in cycle T8 (Step 39). After cycle T9, data @002010, @002014, @002018, and @00201C after the address 0x002010 are sequentially read from the nonvolatile memory 55, and are written into D0/D1, D2/D3, D4/D5, and D6/D7 of the way 1, respectively.

The CPU 53 further requests a data read of 2 bytes from 0x002010 which is the next consecutive address in cycle T12. At this time, the data of the address 0x002010 has been prefetched in the way 1, so that it is a cache hit. The data is read in cycle T13 shown in FIG. 16. In the comparative example, the data of the address 0x002010 has not been cached, so that a cache miss occurs. The data of the address 0x002010 is finally read in cycle T18. By performing the prefetch according to the present embodiment, the occurrence of the cache miss can be prevented and thus the execution cycle can be reduced by 5 cycles. The 2-byte data read is performed in 2 cycles upon a cache hit, and requires 7 cycles when a cache miss occurs. Assuming that one way=one line is configured in 16 bytes and when continuous access is performed every 2 bytes, seven cache hits and one cache miss occur in eight continuous accesses in the comparative example in which prefetching is performed only within the way and which requires 21 cycles. On the other hand, as shown in the present embodiment, by allowing the 2 ways to alternately function as the access target and the prefetch target, the cache miss will not occur, and the number of required cycles is only 16.

Further, as shown in FIGS. 14 to 16, the instruction fetch and data read cycles can be performed also during the data prefetch. The cycle for performing prefetch can be hidden.

After the data prefetch to the way 1 is completed, the data corresponding to D0/D1, D2/D3, D4/D5 in the direction opposite to the direction that the decrement flag 66_0 indicates, are read from the data D6/D7 of the way 0 which has been accessed, in cycles 15, 16, 17, 18 shown in FIG. 16. This is the result of performing Steps 12 to 14 of the flow charts shown in FIGS. 3 to 6. It is possible to reduce the probability of cache misses in case of disturbance of the continuous access. Meanwhile, the cache controller 63 can be designed not to perform Steps 12 to 14. In this case, it is possible to stop reading in the direction opposite to the direction that the decrement flag 66_0 indicates, which will be useless if the continuous access is continued, thus making it possible to reduce the power consumption.

FIGS. 17 and 18 show a timing chart of an operation example in which the 2-way caches operates independently of each other.

In FIG. 17, the CPU 53 requests a data read of 2 bytes from the address 0x002008 in cycle T1. At this time, the value of the tag 65_0 of the way 0 is 0x01219, the value of the tag 65_1 of the way 1 is 0x0121A, and the LRU flag 70 indicates the way 0. There is no tag matching the tag value 0x00200 corresponding to the address 0x002008 at which the data read is requested, so that a cache miss occurs.

Assuming the determination of the cache miss requires two cycles, the cache memory 60 outputs the address 0x002008 to the nonvolatile memory 55 in cycle T3. The target of the cache fill is the way 0 that the LRU flag 70 indicates. The LRU flag 70 is updated to the way 1 in cycle T3. Then, the tag 65_0 of the way 0 is updated to 0x00200 in cycle T4. The data prefetch is performed in the nonvolatile memory 55, which is assumed to require 3 cycles. The value @002008 of the address 0x002008 is read in cycle T6. The data is written into D4/D5 of the way 0 (64_0) in cycle T7 shown in FIG. 18, and at the same time, is output to the CPU 53.

In FIG. 18, the CPU 53 requests a data read of 2 bytes from the address 0x00200A in cycle T8. The data read request in cycle T1 is the request to read data of 2 bytes from the address 0x002008. Thus, the data read request in cycle T1 is the request to continuously read in the address increment direction. The decrement flag 66_0 of the way 0 is maintained with 0 that indicates the address increment direction. The data of the address 0x00200A, which has been written into D5 of the way 0 (64_0) by the previous cache fill, so that it is a cache hit. The data is output as @00200A in cycle T9 as the read data of the CPU.

Meanwhile, the data prefetch operation shown in the flow charts of FIGS. 3 to 6 is started. After the cache fill that occurred by the data read request of 2 bytes from the address 0x002008 in cycle T1, the data area D6/D7 in the direction that the decrement flag 66_0 indicates starting from D4/D5 of the way 0, is not yet filled (Step 35). Thus, the operation issues the address 0x00200C to the nonvolatile memory 55 in cycle T6, and writes the data @0x00200c, which is read in cycle T7 shown in FIG. 18, into the data area D6/D7 in cycle T8 (Step 36). Then, the operation proceeds to Step 4. However, the tag value of the way 0 and the tag value of the way 1 are not continuous, so that the data prefetch shown in Steps 38 to 48 is not performed. Instead, the data of the addresses 0x002000 and 0x002004 are read into D0/D1 and D2/D3 of the way 0, respectively, in cycles T8, T9, and T10 as shown in FIG. 18, while the data of the way 1 is maintained. The cache memory 60 functions as a 2-way cache memory.

In this way, the cache control circuit according to the present embodiment is designed to autonomously switch between functions, whether the two ways are allowed to function as two way caches or to alternately function as the prefetch target as a whole, only by referring to the value of the tag and the decrement flag.

Although the invention made by the present inventors has been specifically described based on the embodiments, the present invention is not limited to the specific embodiments, and it goes without saying that various changes and modifications can be made without departing from the scope of the present invention.

For example, the present invention is applicable not only to the embodiment of the data cache, but also to the instruction cache and the unified cache. Further, the number of ways is not limited to two and can be arbitrarily determined, and the number of cycles for the determination of cache hit/miss can be designed appropriately. Further, the number of cycles for the data read from the nonvolatile memory can be arbitrary.

INDUSTRIAL APPLICABILITY

The present invention relates to techniques for prefetching of data to the cache memory, and in particular, to techniques that can be widely applied to semiconductor devices with cache memory.

EXPLANATION OF REFERENCE NUMERALS

1 step of determining whether the address of continuous access continues
2 step of giving the address change direction attribute (decrement flag) to the way
3 step of accessing the way
4 step of determining whether or not appropriate for the prefetch operation
5 step of performing prefetching
50 semiconductor device (secure microcontroller)
51 address bus
52 data bus
53 processor (CPU)
54 DAM (Direct Memory Access) controller
55 nonvolatile memory
56 ROM (Read Only Memory)
57 RAM (Random Access Memory)
58 peripheral module
60 cache memory
61 data cache
62 instruction cache
63 cache controller
64 way
65 tag
66 decrement flag
67 valid flag
68 address control unit
69 data control unit
70 LRU (Least Recently Used) flag
71 LRU control unit
72 tag control unit
73 decrement flag control unit
74 valid flag control unit
75 cache controller internal address bus
76 cache controller internal data bus
77 memory unit
78 read buffer
79 selector

What is claimed is:
1. A semiconductor device comprising:
a processor;
a memory;
a plurality of tags;
a plurality of ways each of which can store a plurality of data of consecutive addresses of the memory in which a tag value stored in each tag of the plurality of tags is taken as a reference address; and
a cache controller,
wherein each of the plurality of ways is provided with an address change direction flag that indicates a direction in which the address is either incremented or decremented with respect to the last two accesses to the way,
wherein when a first access and a second access are accesses that are performed in succession to consecutive addresses from the processor to the memory, and when the second access is the access through a first way of the plurality of ways, the cache controller is configured to determine presence or absence of a second way having a same address change direction flag as an address change direction flag of the first way among the plurality of ways and prefetch data to the second way based on a result of the determination of the presence or absence of the second way,
wherein the second way has a tag value which is continuous with a tag value of the first way in a direction opposite to a direction that the same address change direction flag indicates, and wherein the data prefetched to the second way is data indicated by a tag value which is continuous with the tag value of the first way in the direction that the same address change direction flag indicates.

2. The semiconductor device according to claim 1,
wherein when the second access is the access to the same way and the same tag value as in the case of the first way, the cache controller is configured to allow setting of the address change direction flag when a target address of the second access is smaller than a target address of the first access.

3. The semiconductor device according to claim 1,
wherein, if it is a cache miss, the cache controller is configured to allow performing a cache fill in units of the data length obtained by dividing the total data length of the data stored in the way by an integer.

4. The semiconductor device according to claim 3,
wherein in the cache controller, the each of the ways is provided with a valid flag in units of the data length of the cache fill,
wherein when a cache miss occurs, the cache controller is configured to allow clearing of all the valid flags corresponding to the target way of the cache fill, and allow setting of the valid flag corresponding to the cache fill data.

5. The semiconductor device according to claim 4,
wherein the cache controller is configured to allow prefetching of data into an area within the first way in which the corresponding valid flag is not set, in the direction indicated by the address change direction flag corresponding to the first way, after the second access.

6. The semiconductor device according to claim 5,
wherein when the address change direction flag corresponding to the second way and the address change direction flag corresponding to the first way match each other, and when the tag value corresponding to the second way is continuous in the direction opposite to the direction that the address change direction flag indicates with respect to the tag value corresponding to the first way, the cache controller is configured to allow prefetching of data to the second way after the prefetching of data to the area within the first way,
wherein when the address change direction flag corresponding to the second way does not match the address change direction flag corresponding to the first way, or when the tag value corresponding to the second way is not continuous in the direction opposite to the direction that the address change direction flag indicates with respect to the tag value corresponding to the first way, the cache controller is configured, after the prefetching of data to the area within the first way, to allow prefetching of data to the area within the first way in the direction opposite to the direction indicated by the address change direction flag corresponding to the first way after the second access within the first way.

7. The semiconductor device according to claim 1,
wherein the processor is configured to allow performing the access following the second access, after the second access is completed and before the cache memory completes the prefetch.

8. The semiconductor device according to claim 1,
wherein each of the ways is configured to allow caching of data of an arbitrary address in the memory.

9. The semiconductor device according to claim 1, further comprising an instruction cache, wherein the ways are data caches of the processor.

10. A method for prefetching data in a cache memory located between a processor and a memory, the cache memory including a plurality of tags, and a plurality of ways each capable of storing a plurality of data of consecutive addresses of the memory in which a tag value stored in each tag of the plurality of tags is taken as a reference address,
wherein the method comprises:
a first step of determining whether a first access and a following second access are accesses to consecutive addresses from the processor to the memory;
when the determination result of the first step is the accesses to consecutive addresses, and when the first access and the second access are the accesses to a first way of the ways and by the same tag value, a second step of giving an address change direction attribute that indicates a direction in which the address is either incremented or decremented with respect to the last two accesses to the first way;
a third step of accessing the first way by the second access;
a fourth step of determining presence or absence of a second way having a same address change direction attribute as an address change direction attribute of the first way among the plurality of ways; and
a fifth step of prefetching of data to the second way as a target based on the determination result of the fourth step,
wherein the second way has a tag value which is continuous with a tag value of the first way in a direction opposite to the direction that the same address change direction attribute indicates, and
wherein the data prefetched to the second way is data indicated by a tag value which is continuous with the tag value of the first way in the direction that the same address change direction attribute indicates.

11. The method for prefetching data according to claim 10,
wherein the fourth step is preformed after the third step, regardless of whether the third step is a cache hit or a cache miss,
wherein if the third step is a cache miss, the third step updates the tag value of the first way and the fifth step determines whether or not to perform prefetching based on the updated tag value of the first way.

12. The method for prefetching data according to claim 10,
wherein the first step sets an address decrement direction as the address change direction attribute, when the second access is the access to the same way and the same tag value as in the case of the first access, and when a target address of the second access is smaller than a target address of the first access.

13. The method for prefetching data according to claim 10,
wherein, if it is a cache miss, the third step performs a cache fill in units of the data length obtained by dividing the total data length of the data stored in the way by an integer.

14. The method for prefetching data according to claim 13,
wherein each of the ways has a valid flag in units of the data length of the cache fill, wherein when a cache miss occurs, the third step clears all the valid flags corresponding to the way of the target way of the cache fill, and sets the valid flag corresponding to the cache fill data.

15. The method for prefetching data according to claim 14, further including a sixth step of prefetching of data to an area within the first way in which the corresponding valid flag is not set, in the direction indicated by the address change direction attribute corresponding to the first way, after the third step.

16. The method for prefetching data according to claim 15, further including a seventh step of prefetching of data to the area within the first way in which the corresponding valid flag is not set, in the direction opposite to the direction indicated by the address change direction attribute corresponding to the first way, by performing the fourth step after the sixth step and based on the determination result of absence in the fourth step.

17. A semiconductor device comprising:
a processor;
a memory;
a plurality of tags and a plurality of ways that correspond one-to-one to each other; and
a cache controller,
wherein when a first access and a second access are accesses that are performed in succession to consecutive addresses from the processor to the memory, and when the second access is the access through a first way of the plurality of ways, the cache controller is configured to perform the following operations:
prefetching of data indicated by a tag value which is greater by 1 than a tag value of the first way to a second way having a same address change direction attribute indicating a direction that an address is incremented as an address change direction attribute of the first way among the plurality of ways when the second access is the access in a direction in which the address is incremented with respect to the first access, wherein the second way has a tag value which is continuous with the tag value of the first way in a direction opposite to the direction that the address is incremented; and
prefetching of data indicated by a tag value which is smaller by 1 than the tag value of the first way to the second way when the second access is the access in a direction in which the address is decremented with respect to the first access, wherein the second way has a tag value which is continuous with the tag value of the first way in the direction that the address is decremented and both the first way and the second way have a same address change direction attribute indicating the direction that the address is decremented.

* * * * *